(12) United States Patent
Kwak et al.

(10) Patent No.: US 11,924,824 B2
(45) Date of Patent: Mar. 5, 2024

(54) METHOD FOR TRANSMITTING SCHEDULING INFORMATION RELATED TO V2X OPERATION IN WIRELESS COMMUNICATION SYSTEM AND TERMINAL USING METHOD

(71) Applicant: LG ELECTRONICS INC., Seoul (KR)

(72) Inventors: Kyuhwan Kwak, Seoul (KR); Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 439 days.

(21) Appl. No.: 17/278,249

(22) PCT Filed: Aug. 7, 2019

(86) PCT No.: PCT/KR2019/009836
§ 371 (c)(1),
(2) Date: Mar. 19, 2021

(87) PCT Pub. No.: WO2020/060027
PCT Pub. Date: Mar. 26, 2020

(65) Prior Publication Data
US 2021/0360655 A1 Nov. 18, 2021

Related U.S. Application Data

(60) Provisional application No. 62/734,155, filed on Sep. 20, 2018.

(51) Int. Cl.
H04W 72/1263 (2023.01)
H04L 1/08 (2006.01)
(Continued)

(52) U.S. Cl.
CPC ....... *H04W 72/1263* (2013.01); *H04L 5/0051* (2013.01); *H04L 27/2607* (2013.01); *H04W 4/40* (2018.02); *H04W 72/0446* (2013.01)

(58) Field of Classification Search
CPC ......... H04W 72/1263; H04W 72/1268; H04W 72/1273; H04W 4/40; H04W 4/42;
(Continued)

(56) References Cited

U.S. PATENT DOCUMENTS 8,432,855 B2 * 4/2013 Yoo ........................ H04L 1/0031
370/328
9,350,503 B2 * 5/2016 Kim ........................ H04L 5/001
(Continued)

FOREIGN PATENT DOCUMENTS

KR   10-2016-0135735   11/2016
WO      2017178993     10/2017

OTHER PUBLICATIONS

PCT International Application No. PCT/KR2019/009836, International Search Report dated Nov. 12, 2019, 4 pages.

*Primary Examiner* — Jenee Holland
(74) *Attorney, Agent, or Firm* — LEE, HONG, DEGERMAN, KANG & WAIMEY

(57) ABSTRACT

The present disclosure provides a method for transmitting scheduling information in a wireless communication system performed by a user equipment (UE) that supports a vehicle-to-everything (V2X) operation, including transmitting the scheduling information based on a predefined resource or a repeated transmission of a basic unit, wherein the UE transmits the scheduling information by reflecting index information of a sequence applied to a reference signal related to the transmission of the scheduling information, and wherein the index information has different values depending on the number of the repeated transmissions, a
(Continued)

transmission timing of the scheduling information, or a transmission type.

11 Claims, 37 Drawing Sheets

(51) Int. Cl.
  *H04L 5/00*         (2006.01)
  *H04L 27/26*        (2006.01)
  *H04W 4/40*         (2018.01)
  *H04W 72/0446*      (2023.01)
  *H04W 72/21*        (2023.01)

(58) Field of Classification Search
  CPC ......... H04W 4/44; H04W 4/46; H04W 72/04;
                H04W 72/044; H04W 72/0446; H04W
                8/20; H04W 36/0072; H04L 5/0048;
                H04L 5/0051; H04L 5/0053; H04L
                27/2607; H04L 25/0226
  See application file for complete search history.

(56) References Cited

U.S. PATENT DOCUMENTS

| | | | |
|---|---|---|---|
| 9,955,460 B2 | 4/2018 | Tavildar et al. | |
| 10,645,527 B2* | 5/2020 | Kwon | H04W 4/08 |
| 2005/0288053 A1* | 12/2005 | Gu | H04W 52/48 |
| | | | 455/69 |
| 2007/0041330 A1* | 2/2007 | Bostica | H04W 24/00 |
| | | | 370/254 |
| 2009/0052392 A1* | 2/2009 | Sumasu | H04W 36/02 |
| | | | 370/331 |
| 2009/0201863 A1* | 8/2009 | Pi | H04L 5/0091 |
| | | | 370/329 |
| 2010/0284363 A1* | 11/2010 | Ahn | H04L 27/2602 |
| | | | 375/132 |
| 2011/0128896 A1* | 6/2011 | Huang | H04W 72/04 |
| | | | 370/336 |
| 2011/0243066 A1* | 10/2011 | Nayeb Nazar | H04L 1/0073 |
| | | | 370/328 |
| 2012/0039286 A1* | 2/2012 | Okubo | H04L 1/1861 |
| | | | 370/329 |
| 2012/0182977 A1* | 7/2012 | Hooli | H04W 72/20 |
| | | | 370/336 |
| 2012/0210185 A1* | 8/2012 | Venkataraj | G08C 25/02 |
| | | | 714/E11.01 |
| 2012/0218882 A1* | 8/2012 | Ko | H04W 72/23 |
| | | | 370/335 |
| 2012/0320853 A1* | 12/2012 | Kwon | H04L 1/1812 |
| | | | 370/329 |
| 2013/0136070 A1* | 5/2013 | Cheng | H04L 27/34 |
| | | | 370/329 |
| 2013/0294242 A1* | 11/2013 | Zhao | H04W 72/1268 |
| | | | 370/235 |
| 2014/0080506 A1* | 3/2014 | Siomina | H04W 64/00 |
| | | | 455/456.1 |
| 2014/0133382 A1* | 5/2014 | Shin | H04L 1/0076 |
| | | | 370/312 |
| 2014/0219206 A1* | 8/2014 | Han | H04L 1/1896 |
| | | | 370/329 |
| 2014/0328297 A1* | 11/2014 | She | H04W 72/20 |
| | | | 370/329 |
| 2016/0269104 A1* | 9/2016 | Lee | H04J 11/00 |
| 2016/0278009 A1* | 9/2016 | Sorrentino | H04L 1/1819 |
| 2017/0150538 A1 | 5/2017 | Wei | |
| 2017/0230956 A1 | 8/2017 | Kim et al. | |
| 2017/0257185 A1* | 9/2017 | Hong | H04L 1/1825 |
| 2017/0273128 A1* | 9/2017 | Abedini | H04W 76/14 |
| 2017/0331573 A1* | 11/2017 | Li | H04J 1/04 |
| 2018/0054246 A1* | 2/2018 | Kong | H04L 5/0046 |
| 2018/0098323 A1* | 4/2018 | Zhang | H04L 5/00 |
| 2018/0110057 A1* | 4/2018 | Park | H04B 7/0452 |
| 2018/0199343 A1* | 7/2018 | Deogun | H04L 5/0044 |
| 2018/0227106 A1* | 8/2018 | Kim | H04L 5/0048 |
| 2018/0254859 A1* | 9/2018 | Islam | H04W 72/0446 |
| 2019/0254091 A1* | 8/2019 | Kim | H04L 5/0078 |
| 2019/0356451 A1* | 11/2019 | Zhang | H04W 72/23 |
| 2019/0387377 A1* | 12/2019 | Zhang | H04W 52/383 |
| 2020/0107351 A1* | 4/2020 | Lee | H04L 5/0082 |
| 2021/0160844 A1* | 5/2021 | Lin | H04W 72/20 |
| 2021/0314750 A1* | 10/2021 | Nguyen | H04W 72/569 |

* cited by examiner

FIG. 17

| Stating timing index | #0 | #1 | #2 | #3 |
|---|---|---|---|---|

| Repetition number | | Cyclic shift | | |
|---|---|---|---|---|
| 1 | 0 | 3 | 6 | 9 |
| 2 | 3 | 6 | 9 | 0 |
| 3 | 6 | 9 | 0 | 3 |
| 4 | 9 | 0 | 3 | 6 |

FIG. 19

| Stating timing index | #0 | #1 | #2 | #3 | #4 | #5 | #6 | #7 |
|---|---|---|---|---|---|---|---|---|
| 1 | 0 | 1 | 2 | 3 | 4 | 5 | 6 | 7 |
| 2 | 1 | 2 | 3 | 4 | 5 | 6 | 7 | 0 |
| 3 | 3 | 4 | 5 | 6 | 7 | 0 | 1 | 2 |
| 4 | 7 | 0 | 1 | 2 | 3 | 4 | 5 | 6 |

Repetition number / Cyclic shift

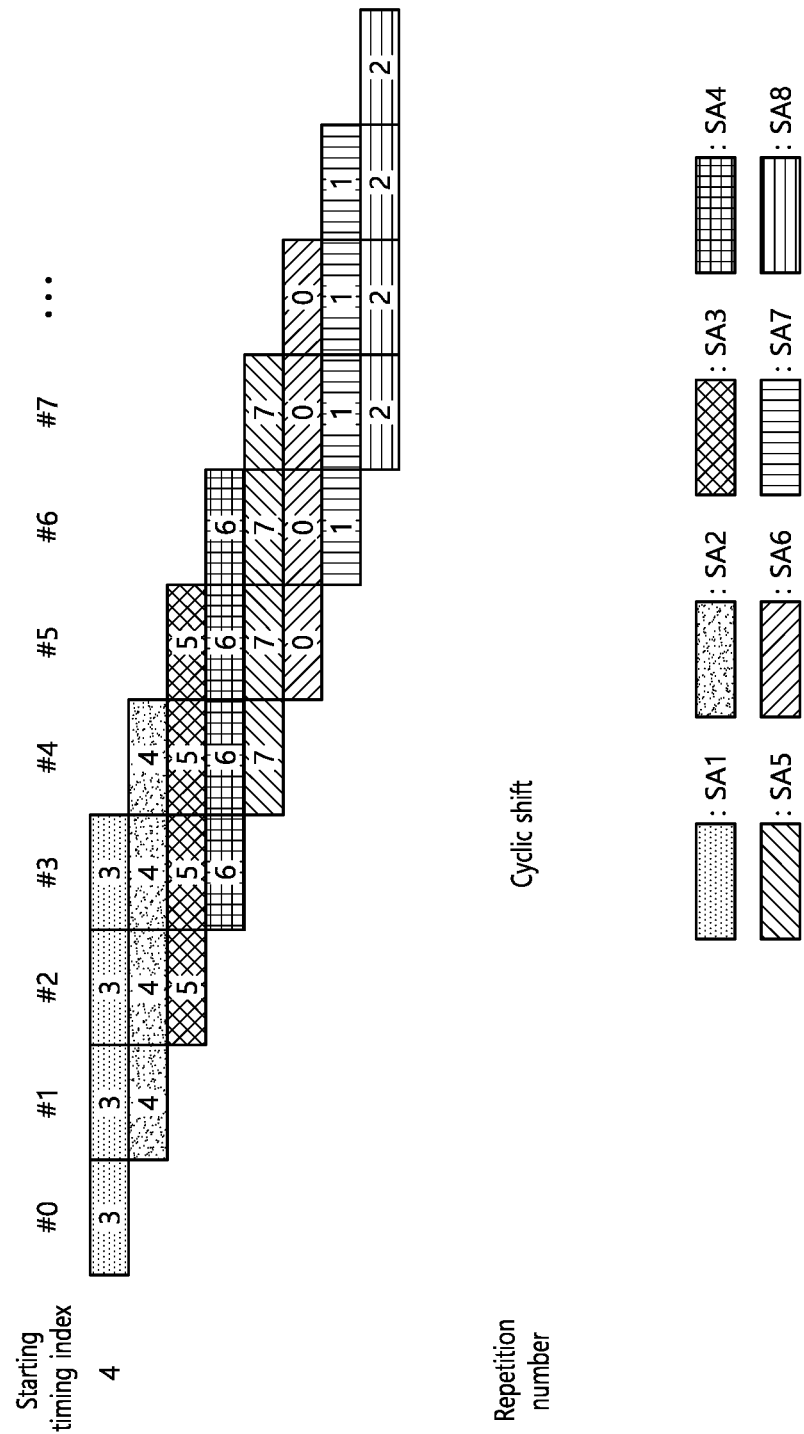

METHOD FOR TRANSMITTING SCHEDULING INFORMATION RELATED TO V2X OPERATION IN WIRELESS COMMUNICATION SYSTEM AND TERMINAL USING METHOD

CROSS-REFERENCE TO RELATED APPLICATIONS

This application is the National Stage filing under 35 U.S.C. 371 of International Application No. PCT/KR2019/009836, filed on Aug. 7, 2019, which claims the benefit of earlier filing date and right of priority to U.S. Provisional Application No. 62/734,155 filed on Sep. 20, 2018, the contents of which are all hereby incorporated by reference herein in their entirety.

BACKGROUND OF THE DISCLOSURE

Field of the Disclosure

The present disclosure relates to a wireless communication and, more particularly, to a method for transmitting scheduling information related to a V2X operation in a wireless communication system and a user equipment using the method.

Related Art

Recently, in 3GPP standardization organization, it has been considered a network slicing technique for implementing a plurality of logical networks on a single physical network in the NR system, which is 5G wireless communication system. To this end, the logical networks needs to be capable of supporting services having various requirements (e.g., enhanced Mobile Broadband (eMBB), massive Machine Type Communication (mMTC), Ultra Reliable Low Latency Communication (URLLC), etc.). In addition, in the physical layer system of the NR system, it has been considered a technique for supporting an orthogonal frequency division multiplexing (OFDM) scheme in which a variable numerology is applicable according to the various services. In other words, in the NR (New RAT) system, an OFDM scheme (or a multiple access scheme) in which independent numerologies are applied in each time and frequency resource region may be supported.

In the aspect of a reception user equipment (UE), when transmission UEs transmit a scheduling assignment (SA), since the reception UE is unable to know which service is targeted when the transmission UEs configure and transmit the SA, the reception UE needs to perform a blind decoding (BD) for various assumptions.

Such a BD may cause additional latency and power consumption. Further, even though the assumption on whether the SA is transmitted is predefined in a system or (pre)configured to the reception UE through a higher layer signaling and/or a physical layer signaling by a base station, the reception UE still needs to perform a BD.

Therefore, the present disclosure proposes a method for reducing the latency for performing a BD and the power consumption therefor and an apparatus for using the same by reducing the number of BDs performed by the reception UE.

SUMMARY

The present disclosure provides a method for transmitting scheduling information related to a V2X operation in a wireless communication system and a user equipment (UE) using the method.

In an aspect, a method for transmitting scheduling information in a wireless communication system is provided. The method performed by a user equipment (UE) that supports a vehicle-to-everything (V2X) operation may comprise transmitting the scheduling information based on a repeated transmission of a basic unit or a predefined resource, wherein the UE transmits the scheduling information by reflecting index information of a sequence applied to a reference signal related to the transmission of the scheduling information, and wherein the index information has different values depending on a number of the repeated transmissions, a transmission timing of the scheduling information, or a transmission type.

The method may further comprise receiving a configuration related to the transmission of the scheduling information through a higher layer signaling or a physical layer signaling.

The configuration may be a configuration for index information of a sequence applied to the reference signal transmitted together for the transmission of the scheduling information.

A configuration related to the transmission of the scheduling information may be preconfigured to the UE.

The index information may be a cyclic shift (CS) index.

The UE may inform a starting time or an ending time of the transmission of the scheduling information, or the number of repeated transmissions implicitly through the transmission of scheduling information on which the index information of the sequence is reflected.

The index information may be configured as a number related to a greatest transmission number among an allowed repeated transmission number of the scheduling information.

The index information may have different values depending on a number of the repeated transmissions and a transmission starting timing of the scheduling information.

The UE may inform a starting time or an ending time of the transmission of the scheduling information, or the number of repeated transmissions implicitly through the transmission of scheduling information on which the index information of the sequence is reflected.

The scheduling information may be repeatedly transmitted 1, 2, 3, or 4 times, if the number of repeated transmissions is 1: when a starting time of the transmission of the scheduling information is a first transmission time, the index information has a first value, when a starting time of the transmission of the scheduling information is a second transmission time, the index information has a second value, when a starting time of the transmission of the scheduling information is a third transmission time, the index information has a third value, and when a starting time of the transmission of the scheduling information is a fourth transmission time, the index information has a fourth value; if the number of repeated transmissions is 2: when a starting time of the transmission of the scheduling information is a first transmission time, the index information has a second value, when a starting time of the transmission of the scheduling information is a second transmission time, the index information has a third value, when a starting time of the transmission of the scheduling information is a third transmission time, the index information has a fourth value, and when a starting time of the transmission of the scheduling information is a fourth transmission time, the index information has a first value; if the number of repeated transmissions is 3: when a starting time of the transmission of the scheduling information is a first transmission time, the index information has a third value, when a starting time of the transmission of the scheduling information is a second transmission time, the index information has a fourth value, when a starting time of the transmission of the scheduling information is a third transmission time, the index information has a first value, and when a starting time of the transmission of the scheduling information is a fourth transmission time, the index information has a second value; if the number of repeated transmissions is 4: when a starting time of the transmission of the scheduling information is a first transmission time, the index information has a fourth value, when a starting time of the transmission of the scheduling information is a second transmission time, the index information has a first value, when a starting time of the transmission of the scheduling information is a third transmission time, the index information has a second value, and when a starting time of the transmission of the scheduling information is a fourth transmission time, the index information has a third value, and the first value, the second value, the third value, and the fourth value are different values.

The first value may be 0, the second value is 3, the third value is 6, and the fourth value is 9.

In another aspect, a user equipment (UE) that supports a vehicle-to-everything (V2X) operation is provided. The UE may comprise a transceiver configured to transmit and receive a wireless signal and a processor operably coupled with the transceiver, the processor being configured to transmit the scheduling information based on a repeated transmission of a basic unit or a predefined resource, wherein the UE transmits the scheduling information by reflecting index information of a sequence applied to a reference signal related to the transmission of the scheduling information, and wherein the index information has different values depending on a number of the repeated transmissions, a transmission timing of the scheduling information, or a transmission type.

In other aspects, a method for transmitting information related to a vehicle-to-everything (V2X) operation is provided. The method performed by a base station may comprise transmitting the information related to a V2X operation, wherein the information related to a V2X operation includes information related to a configuration of index information of a sequence applied to a reference signal transmitted together for a transmission of the scheduling information, and wherein the index information has different values depending on a number of repeated transmissions, a transmission timing of the scheduling information, or a transmission type.

Advantageous Effects

According to the present disclosure, the number of BDs performed by a reception UE is reduced, and the latency for performing a BD and the power consumption therefor can be reduced.

BRIEF DESCRIPTION OF THE DRAWINGS

FIG. 17 schematically illustrates an example for a CS index value depending on the timing on which the transmission starts and the repetition transmission number.

FIG. 19 schematically another example for a CS index value depending on the timing on which the transmission starts and the repetition transmission number.

FIGS. 20A to 20D illustrate another example for a CS index value depending on the timing on which the transmission starts and the repetition transmission number in a different scheme.

DESCRIPTION OF EXEMPLARY EMBODIMENTS

Hereinafter, terms or abbreviations that are not separately defined may be defined in 3GPP TS 36 series or TS 38 series.

Figure 1:
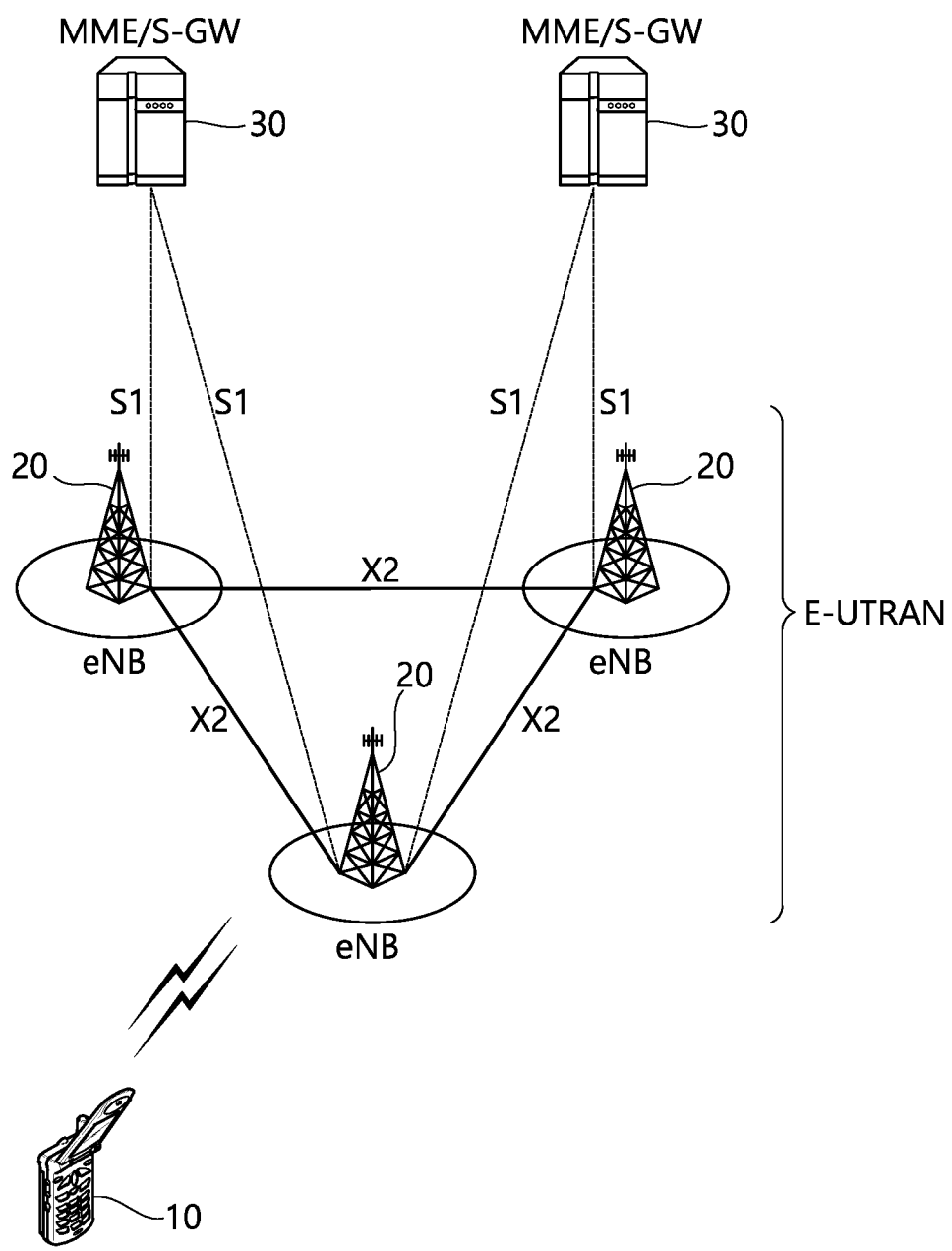
FIG. 1 illustrates a wireless communication system.

FIG. 1 illustrates a wireless communication system. The wireless communication system may also be referred to as an evolved-UMTS terrestrial radio access network (E-UTRAN), or long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
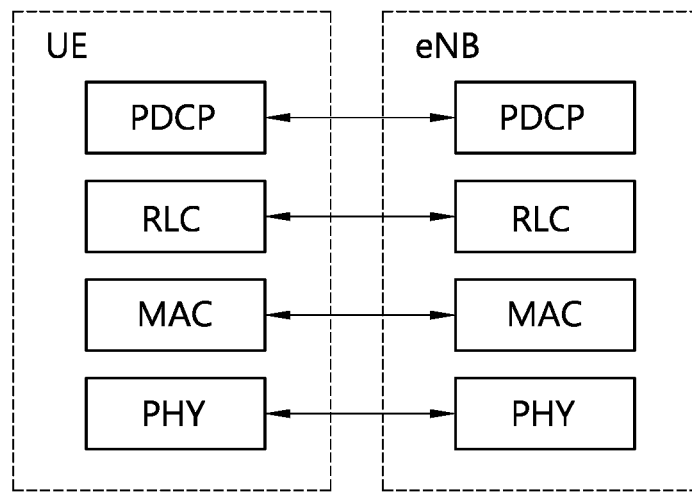
FIG. 2 is a diagram showing a wireless protocol architecture for a user plane.
Figure 3:
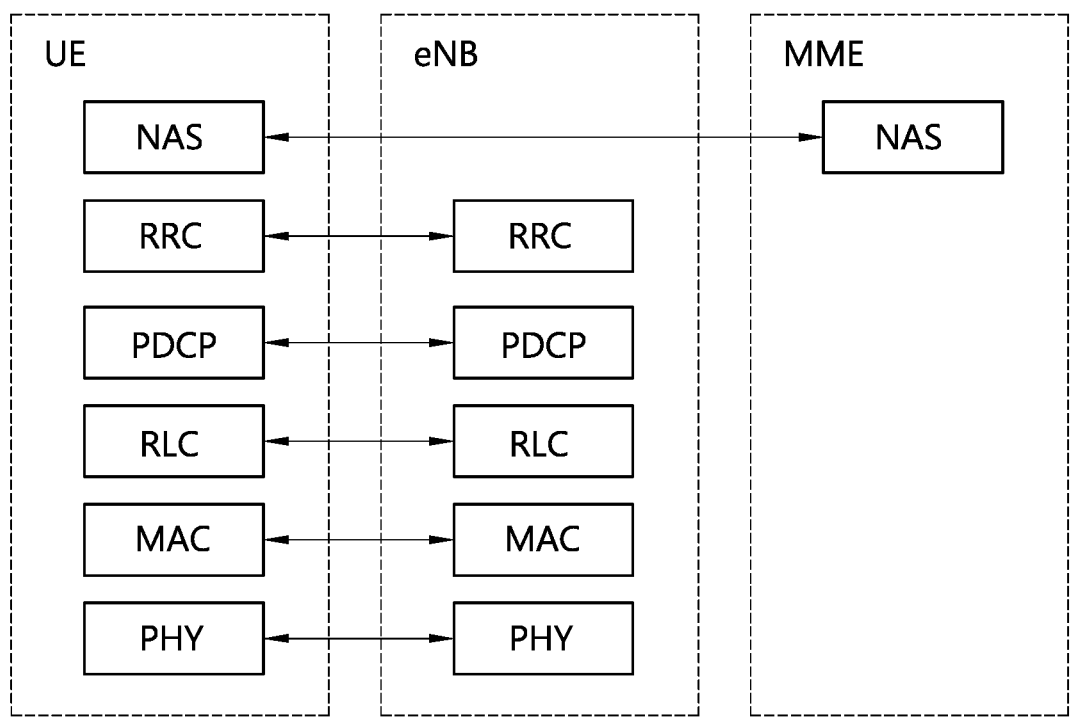
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Figure 4:
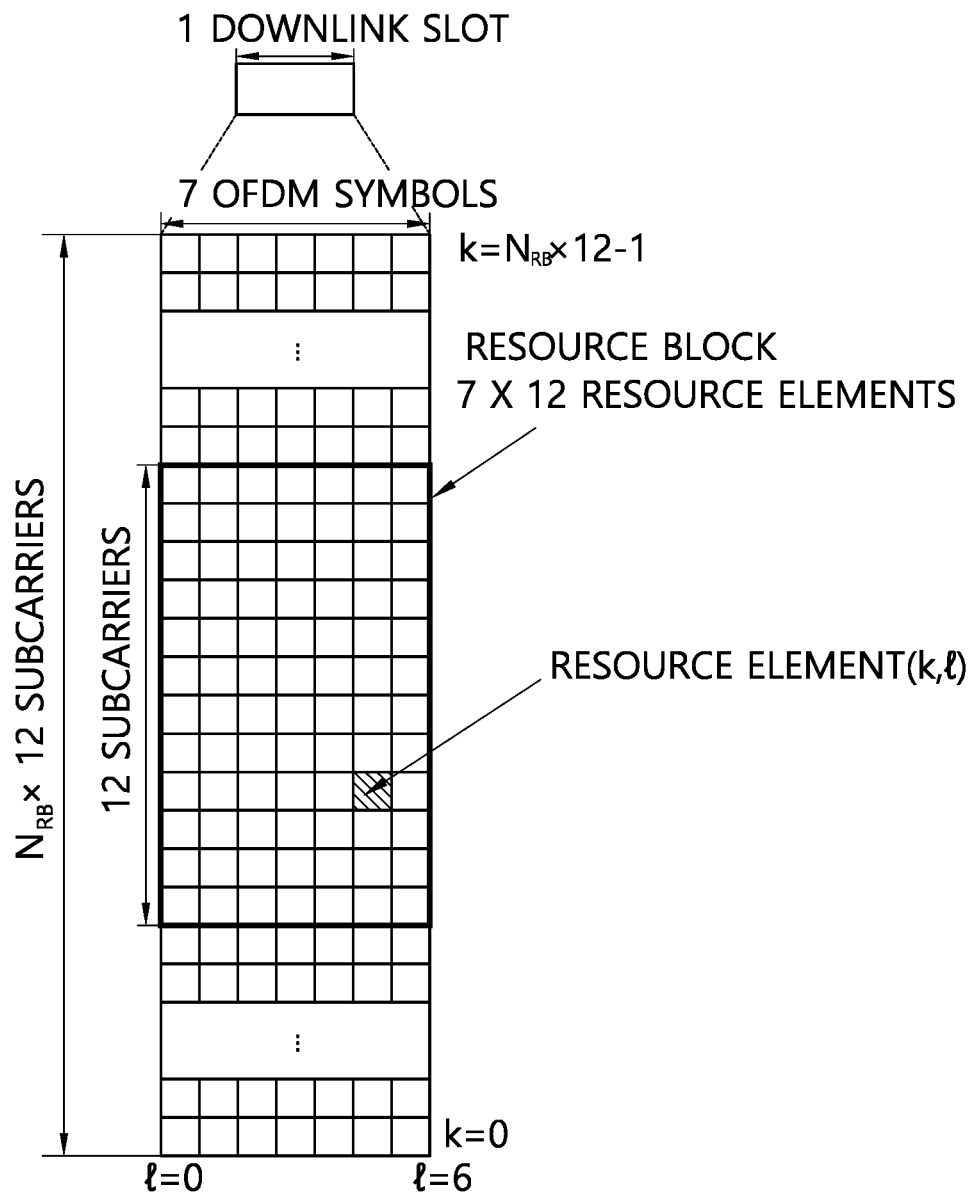
FIG. 4 shows an example of a downlink/uplink (DL/UL) slot structure in a wireless communication system.

FIG. 4 shows an example of a downlink/uplink (DL/UL) slot structure in a wireless communication system. In particular, FIG. 4 shows a structure of a resource grid of a 3GPP LTE (-A) system. There is one resource grid per antenna port.

A slot includes a plurality of orthogonal frequency division multiplexing (OFDM) symbols in a time domain and includes a plurality of resource blocks (RBs) in a frequency domain. The OFDM symbol also refers to one symbol interval. Referring to FIG. 4, a signal transmitted in each slot may be represented by a resource grid including NDL/UL RB*NRB sc subcarriers and NDL/UL symb OFDM symbols. Here, NDL RB denotes the number of resource blocks (RBs) in a downlink slot, and NUL RB denotes the number of RBs in a UL slot. NDL RB and NUL RB depend on a DL transmission bandwidth and a UL transmission bandwidth, respectively. NDL symb denotes the number of OFDM symbols in the downlink slot, and NUL symb denotes the number of OFDM symbols in the UL slot. NRB sc denotes the number of subcarriers constituting one RB.

An OFDM symbol may be called an SC-FDM (Single Carrier Frequency Division Multiplexing) symbol according to a multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 4 illustrates a subframe in which a slot includes 7 OFDM symbols for convenience, embodiments of the present disclosure may be equally applied to subframes having different numbers of OFDM symbols. Referring to FIG. 4, each OFDM symbol includes NDL/UL RB*NRB sc subcarriers in the frequency domain. Subcarrier types may be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

One RB is defined by NDL/UL symb (e.g., 7) consecutive OFDM symbols in the time domain and NRBsc (e.g. 12) consecutive subcarriers in the frequency domain. For reference, a resource composed of an OFDM symbol and a subcarrier is called a resource element (RE) or a tone. Accordingly, an RB is composed of NDL/UL symb*NRB sc. Each RE in the resource grid may be uniquely defined by an index pair (k, l) in a slot. Here, k is an index in the range of 0 to NDL/UL RB*NRB sc-1 in the frequency domain and l is an index in the range of 0 to NDL/UL symb-1.

Two RBs that occupy NRBsc consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to NDL VRB-1, and NDL VRB=NDL RB is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as an VRB pair.

Figure 5:
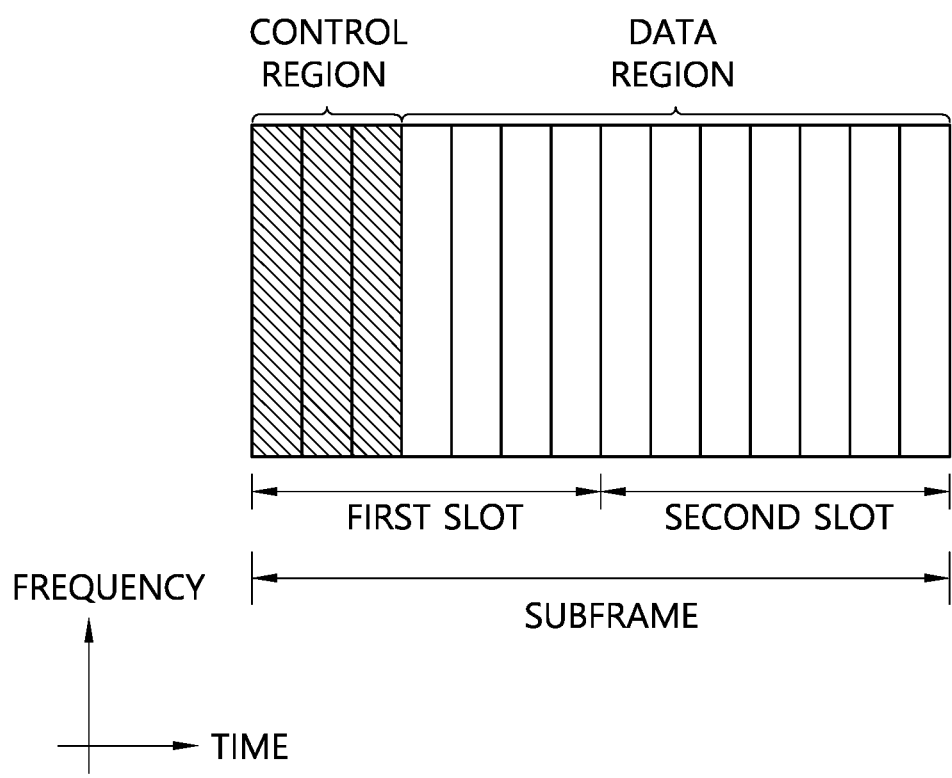
FIG. 5 illustrates a downlink (DL) subframe structure used in the 3GPP LTE/LTE(-A) system.

FIG. 5 illustrates a downlink (DL) subframe structure used in the 3GPP LTE/LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ ACK/NACK as a response to UL transmission.

Control information transmitted via a PDCCH is referred to as downlink control information (DCI). The DCI includes resource allocation information for a UE or a UE group and other control information. For example, the DCI includes transmission format and resource allocation information of a DL shared channel (DL-SCH), transmission format and resource allocation information of a UL shared channel (UL-SCH), paging information on a paging channel (PCH), system information on a DL-SCH, resource allocation information of a higher-layer control message such as a random access response transmitted on a PDSCH, a transmission (Tx) power control command set for individual UEs in a UE group, a Tx power control command, activation indication information of voice over IP (VoIP), etc. The size and usage of the DCI carried by one PDCCH may be changed according to DCI format and the size of the DCI may be changed according to a coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked (or scrambled) with an identifier (e.g. a radio network temporary identifier (RNTI)) according to an owner or usage of the PDCCH. If the PDCCH is for a specific UE, a cell-RNTI (C-RNTI) of the UE may be masked to the CRC. If the PDCCH is for a paging message, a paging identifier (e.g. paging-RNTI (P-RNTI)) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to 9 REGs and one REG corresponds to 4 REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (i.e. a PCFICH and a PHICH). A DCI format and the number of DCI bits are determined according to the number of CCEs.

CCEs are numbered and consecutively used. In order to simplify a decoding process, a PDCCH having a format composed of n CCEs may start from only a CCE having a number corresponding to a multiple of n. The number of CCEs used to transmit a specific PDCCH, that is, a CCE aggregation level, is determined by a BS according to channel state. For example, in case of a PDCCH for a UE having a good DL channel (e.g. a UE adjacent to a B S), one CCE may be sufficient. However, in case of a PDCCH for a UE having a bad channel (e.g. a UE located at a cell edge), 8 CCEs may be required to obtain sufficient robustness.

Figure 6:
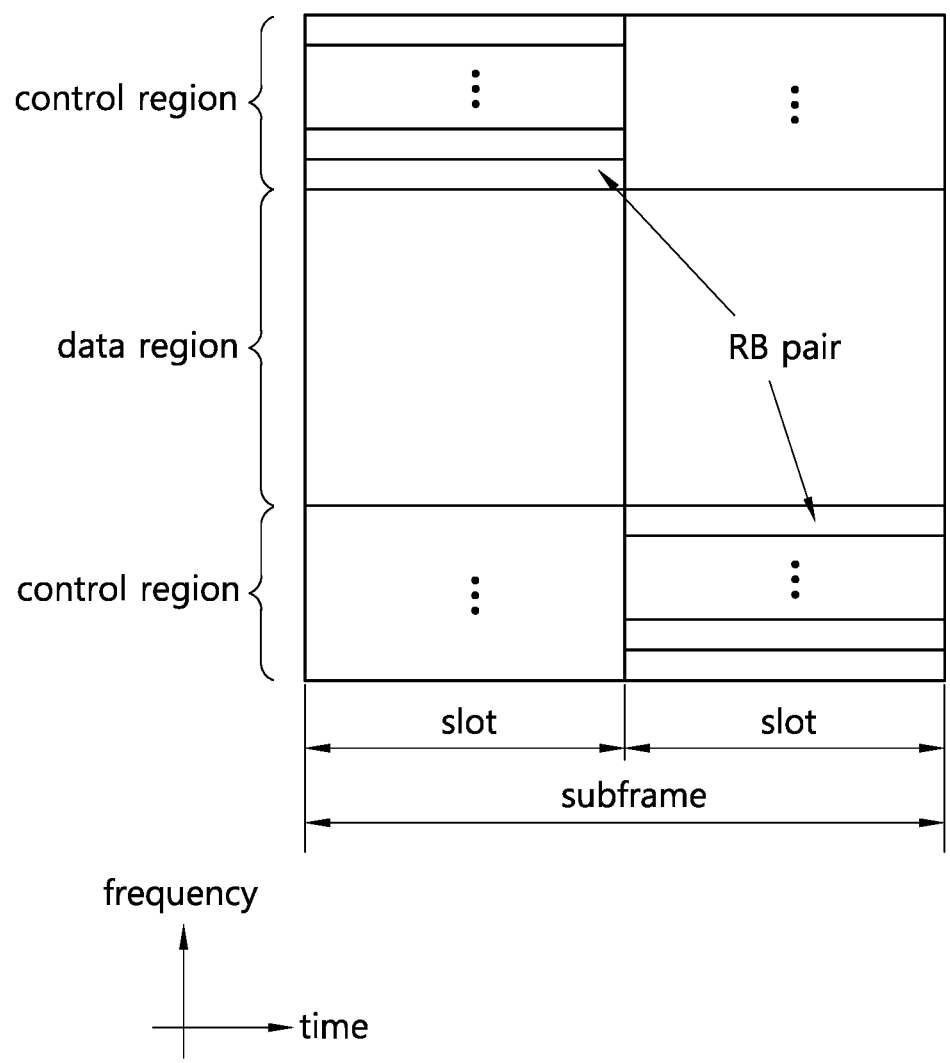
FIG. 6 illustrates a structure of an uplink subframe used in the 3GPP LTE/LTE(-A) system.

FIG. 6 illustrates a structure of an uplink subframe used in the 3GPP LTE/LTE(-A) system.

Referring to FIG. 6, a UL subframe may be divided into a data region and a control region in the frequency domain. One or several PUCCHs may be allocated to the control region to deliver UCI. One or several PUSCHs may be allocated to the data region of the UL subframe to deliver user data. The control region and the data region in the UL subframe may also be referred to as a PUCCH region and a PUSCH region, respectively. A sounding reference signal (SRS) may be allocated to the data region. The SRS is transmitted on the last OFDM symbol of the UL subframe in the time domain and is transmitted on a data transmission band, that is, a data region, of the UL subframe in the frequency domain. SRSs of several UEs, which are transmitted/received on the last OFDM symbol of the same subframe, can be distinguished according to a frequency location/sequence.

If a UE employs an SC-FDMA scheme in UL transmission, in a 3GPP LTE release-8 or release-9 system, a PUCCH and a PUSCH cannot be simultaneously transmitted on one carrier in order to maintain a single carrier property. In a 3GPP LTE release-10 system, support/non-support of simultaneous transmission of a PUCCH and a PUSCH may be indicated by higher layers.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

Hereinafter, a new radio access technology (new RAT) will be described. The new RAT may be abbreviated as new radio (NR).

As more communication devices demand larger communication capacities, there is a need for improved mobile broadband communication as compared to the existing radio access technologies (RAT). Massive machine type Communications (MTC), which connects multiple devices and objects to provide various services anytime and anywhere, is also one of the major issues to consider in next-generation communication. In addition, communication system design considering services/terminals that are sensitive to reliability and latency has been discussed. The introduction of next-generation wireless access technologies considering such enhanced mobile broadband communication, massive MTC, ultra-reliable and low latency communication (URLLC), and the like, has been discussed, and the corresponding technology is referred to as new RAT or NR for the convenience sake in the present disclosure.

Figure 7:
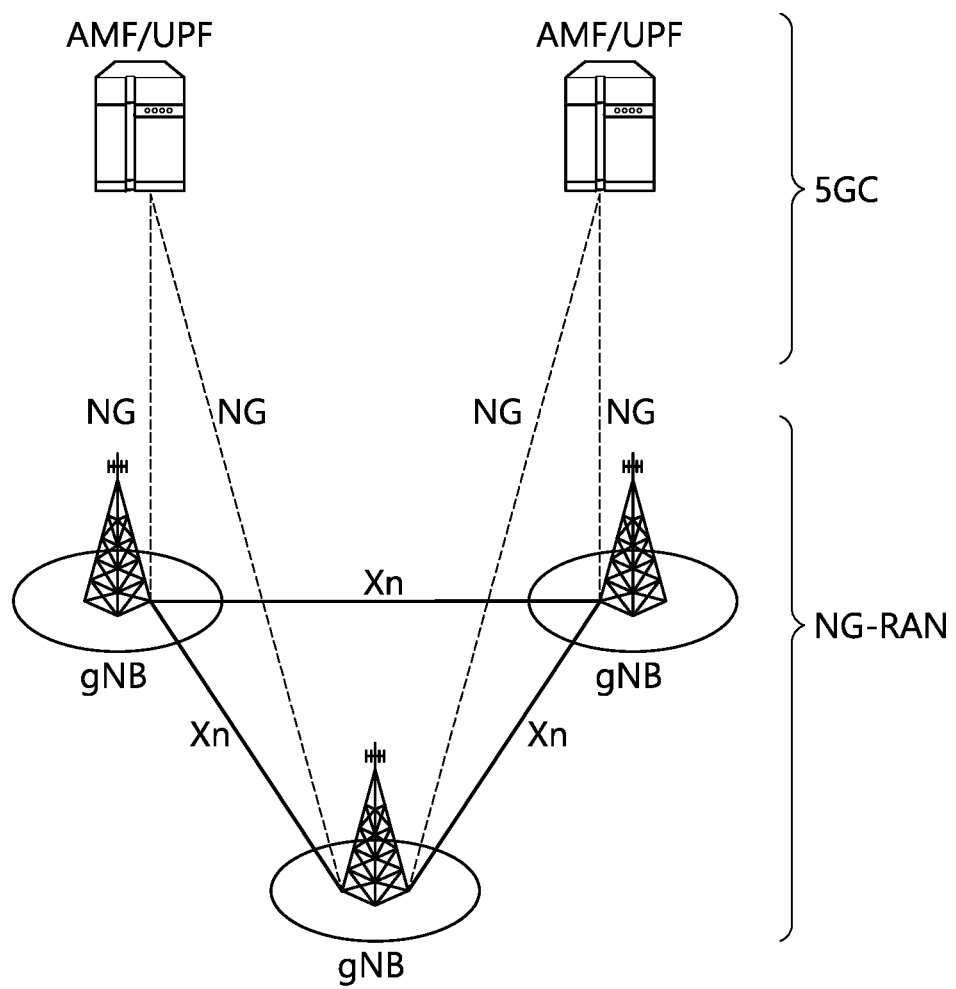
FIG. 7 illustrates a system structure of a new generation radio access network (NG-RAN) to which NR is applied.

FIG. 7 illustrates a system structure of a new generation radio access network (NG-RAN) to which NR is applied.

Referring to FIG. 7, the NG-RAN may include a gNB and/or an eNB providing a user plane and a control plane protocol termination to a terminal. FIG. 4 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 8:
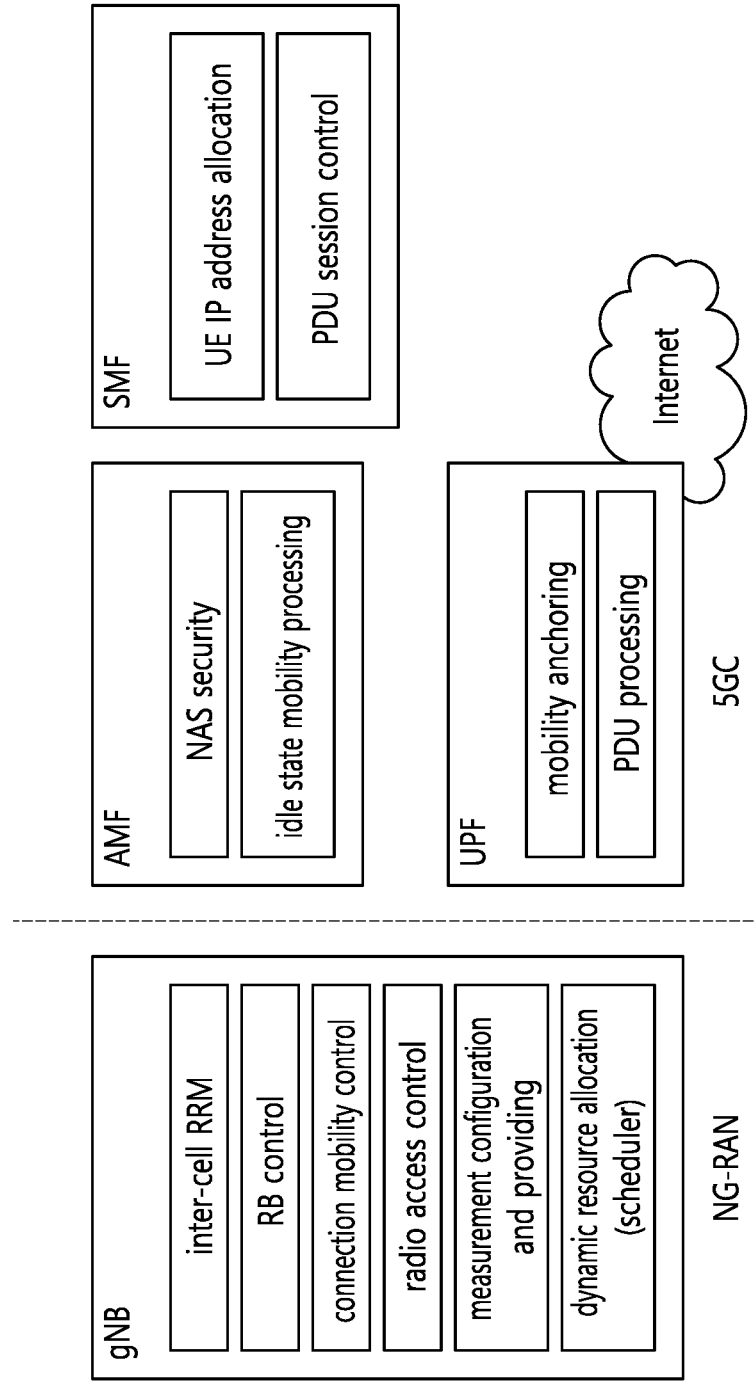
FIG. 8 illustrates functional partitioning between NG-RAN and 5GC.

FIG. 8 illustrates functional partitioning between NG-RAN and 5GC.

Referring to FIG. 8, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

<D2D (Device-to-Device) Operation>

Hereinafter, it is described the components for device-to-device communication (D2D) technique.

Figure 9:
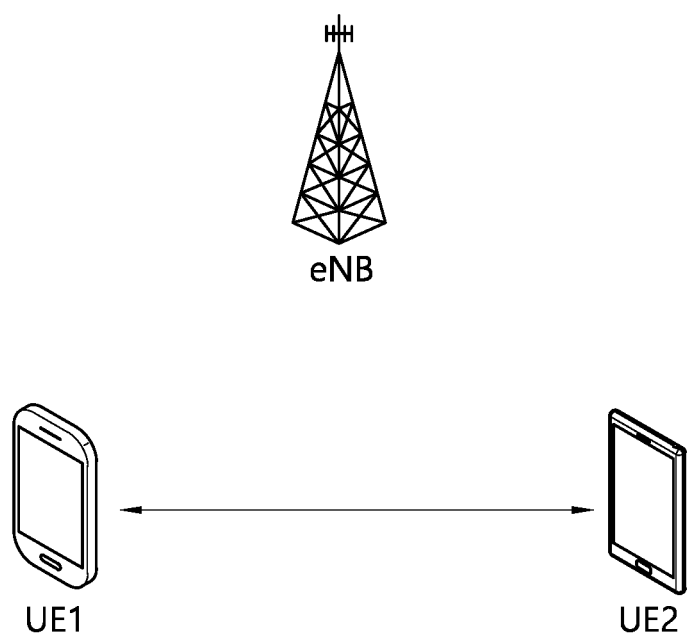
FIG. 9 illustrates a system architecture to which a D2D operation is applied.

FIG. 9 illustrates a system architecture to which a D2D operation is applied.

In FIG. 9, a UE means a user UE, but in the case that a network equipment like an eNB transmits and receives a signal according to a communication scheme between UEs, the network equipment like an eNB may also be regarded as a kind of UE.

Hereinafter, UE1 may be operated to select a resource unit corresponding to a specific resource in a resource pool that means a set of a series of resources and transmit a D2D signal by using the corresponding resource unit.

UE2, which is a reception UE for the transmission, may be configured with a resource pool in which UE1 may transmit a signal and may detect the signal of UE1.

Here, the resource pool may be informed by an eNB in the case that UE1 is within a connection coverage of the eNB, and may be informed by another UE or determined as a predetermined resource in the case that UE 1 is out of a connection coverage of the eNB.

Generally, a resource pool includes multiple resource units, and each UE may select one or multiple resource units and use the one or multiple resource units in its own D2D signal transmission.

Figure 10:
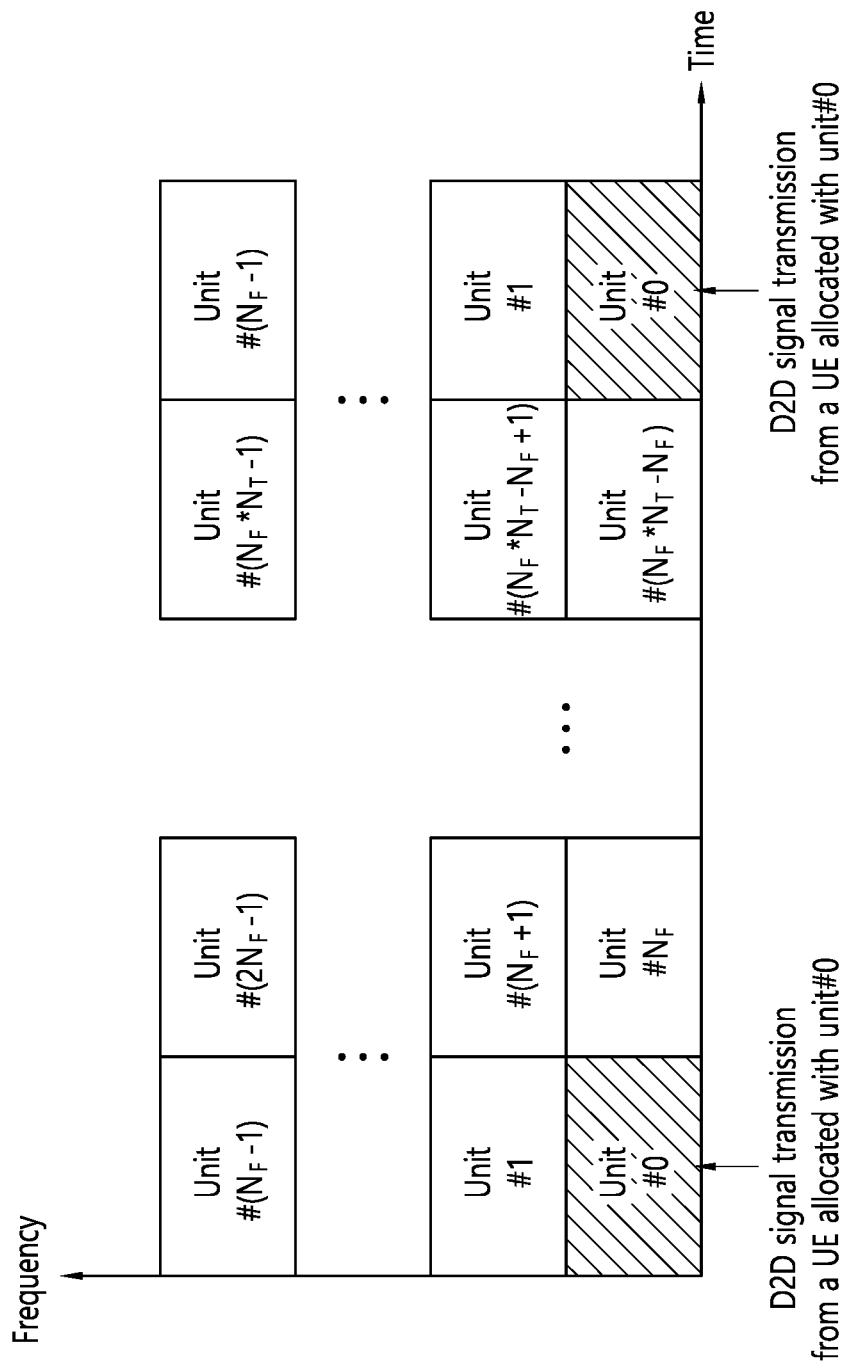
FIG. 10 illustrates an example of a resource unit on time and frequency resource.

FIG. 10 illustrates an example of a resource unit on time and frequency resource.

The example of FIG. 10 corresponds to the case that the entire frequency resource resources are divided by NF, and the entire time resources are divided by NT, and accordingly total NF*NT resource units are defined.

In the example of FIG. 10, the resource pool is repeated in a period of NT subframe. Distinctively, a single resource unit may be present repeatedly as shown in FIG. 10. Alternatively, in order to obtain diversity effect in a time or frequency domain, an index of a physical resource unit which is mapped to a single logical resource unit may be changed in a predetermined pattern depending on a time.

In such a resource unit architecture, a resource pool may mean a set of resource units that a UE intended to transmit a D2D signal uses in a transmission.

The resource pool described above may be sub divided into several types. First, the resource pool may be distinguished according to a content of a D2D signal which is transmitted in each resource pool.

As an example, the contents of the following D2D signal may be distinguished, and a separate resource pool may be configured for each of them.

Scheduling assignment (SA) or D2D (sidelink) control channel:

A signal including information such as a position of resource of a D2D data channel transmitted in a subsequent or a same subframe (SF) by each transmission UE, MCS (modulation and coding scheme) or MIMO (Multiple Input Multiple Output) transmission scheme required to demodulate other data channel, and a timing advance.

This signal may be transmitted with being multiplexed with D2D data on the same resource unit, and in this case, a SA resource pool may mean a pool of resources in which SA and D2D data are multiplexed and transmitted. This may also be called the other name, D2D (sidelink) control channel.

D2D data channel:

A pool of resources that a transmission UE uses for transmitting user data by using a resource designated by SA. In the case that it is available to be multiplexed with D2D data and transmitted on the same resource unit, in the resource pool for D2D data channel, only the D2D data channel excluding SA information is transmitted.

In other words, the resource element which was used for transmitting the SA information in an individual resource unit in a SA resource pool is still used for transmitting D2D data in the D2D data channel resource pool.

Discovery channel:

A resource pool for a message in which information such as an ID of a transmission UE is transmitted and enables for an adjacent UE to discover the transmission UE.

Even in the case that a content of D2D signal described above is the same, depending on a transmission and reception attribute of D2D signal, different resource pool may be used.

As an example, even in the case of the same D2D data channel or a discovery message, depending on a transmission timing determination scheme of a D2D signal (e.g., whether it is transmitted on a reception timing of synchronization reference signal or transmitted by applying a predetermined timing advance), a resource allocation scheme (e.g., whether a transport resource of an individual signal is designated by an eNB to an individual transmission UE or an individual transmission UE selects an individual signal transport resource autonomously in a pool), a signal format (e.g., the number of symbols occupied by each D2D signal in a subframe or the number of subframes used for transmitting a single D2D signal), a signal strength from an eNB or a transmission power strength of a D2D UE, it may be further distinguished as different resource pool.

For the convenience of description, in a D2D communication, a method that an eNB directly indicates a transport resource of a D2D transmission UE is called Mode 1, and a transport resource region is preconfigured or a method that an eNB designates a transport resource region and a UE directly selects a transport resource is called Mode 2.

For a D2D discovery, a case that an eNB directly indicates a resource is called Type 2, and a case that a UE directly selects a transport resource in a preconfigured resource region, or a resource region indicated by an eNB is called Type 1.

The above mentioned D2D may also be called sidelink, and SA may be called physical sidelink control channel (PSCCH). A D2D synchronization signal may be called sidelink synchronization signal (SSS), and the control channel for transmitting the most basic information before a D2D communication transmitted with the SSS may be called Physical sidelink broadcast channel (PSBCH), or in other name, Physical D2D synchronization channel (PD2DSCH).

A signal for a specific UE to inform that the UE is present in a neighbor may include an ID of the specific UE, and such a channel may be called physical sidelink discovery channel (PSDCH).

In Rel. 12 D2D, only a D2D communication UE transmits PSBCH together with SSS, and owing to this, a measurement of SSS is performed by using a DMRS of PSBCH. An out-coverage UE measures a DMRS of PSBCH and measures RSRP of the signal and determines whether the UE itself becomes a synchronization source.

<NR (New RAT)>

As more communication devices require a greater communication capacity, there emerges a need for enhanced mobile broadband communication compared to the existing radio access technology (RAT). In addition, massive machine type communications (MTC) providing various services anywhere and at any time by connecting multiple devices and things is also one of important issues to be taken into consideration in the next-generation communication. Furthermore, the design of a communication system in which services/UEs sensitive to reliability and latency are taken into consideration is also discussed.

As described above, the introduction of a next-generation RAT in which enhanced mobile broadband (eMBB) communication, massive MTC (mMTC) and ultra-reliable and low latency communication (URLLC) are taken into consideration is now discussed. In the present disclosure, the corresponding technology is commonly called NR, for convenience sake.

<Frame Structure for NR>

Figure 11:
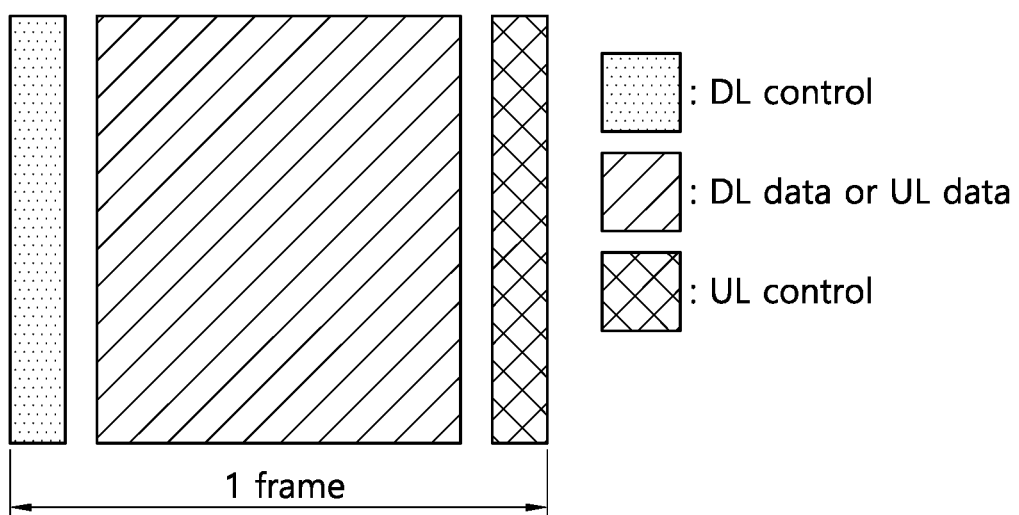
FIG. 11 schematically illustrates an example of a frame structure in the NR system.

FIG. 11 schematically illustrates an example of a frame structure in the NR system.

Referring to FIG. 11, the frame structure of NR is characterized in the self-contained structure that includes all of DL control channel, DL or UL data, UL control channel, and the like in a single frame unit.

At this time, in the DL control channel, DL data scheduling information, UL data scheduling information, and the like may be transmitted, and in the UL control channel, ACK/NACK information for DL data, CSI information (modulation and coding scheme information, MIMO transmission related information, etc.), a scheduling request, and the like may be transmitted.

In FIG. 11, a time gap for DL-to-UL or UL-to-DL switching may be present between the control region and the data region.

In addition, one of DL control/DL data/UL data/UL control may not be configured in a single frame. Alternatively, an order for each channel (e.g., DL control/DL data/UL control/UL data or UL control/UL data/DL control/DL data, etc.) included in a single frame may be changed.

The frame structure of the NR system described with the example of FIG. 8 may be distinguished into 4 types as shown in FIG. 9, largely.

Figure 12:
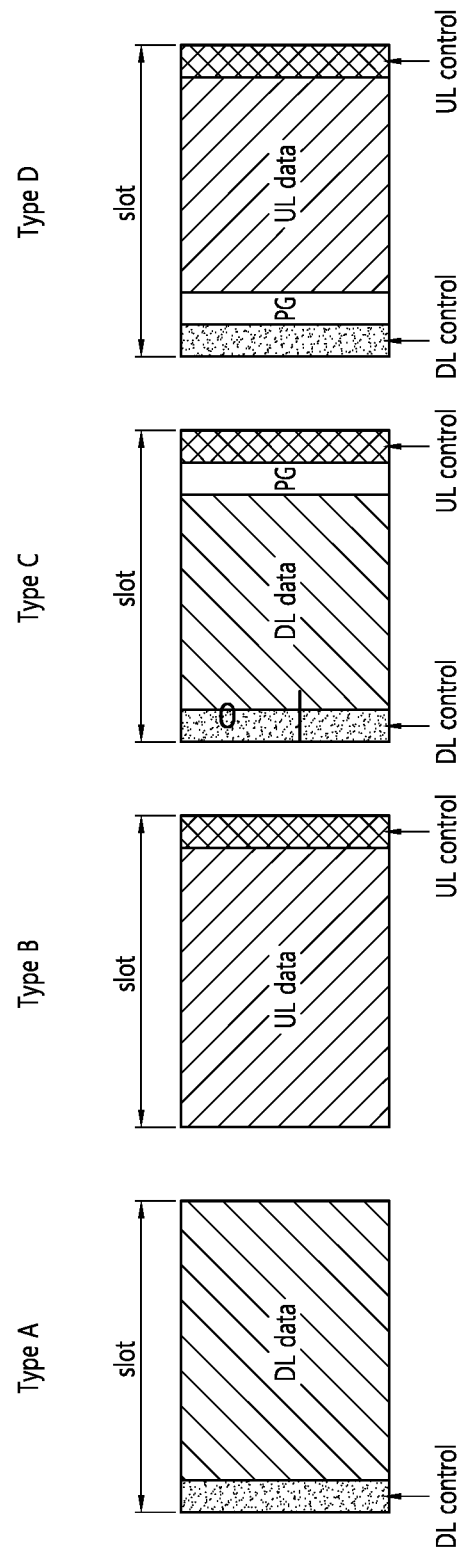
FIG. 12 schematically illustrates another example of a frame structure in the NR system.

FIG. 12 schematically illustrates another example of a frame structure in the NR system.

Type A: DL control+DL data

That is, according to Type A, a single slot (or frame) includes a DL control region and a DL data region.

Type B: UL data+UL control

That is, according to Type B, a single slot (or frame) includes a UL data region and a UL control region. Here, the UL control may be omitted in dynamic manner.

Type C: DL control+DL data+GP (guard period)+UL control

That is, according to Type C, a single slot (or frame) includes a DL control region, a DL data region, a GP (guard period) region and a UL control region.

Type D: DL control+GP+UL data+UL control

That is, according to Type D, a single slot (or frame) includes a DL control region, a GP region, a UL data region and a UL control region. Here, the positions of the UL data and the UL control may be changed, or the UL control may be omitted in dynamic manner.

<Analog Beamforming>

In a millimeter wave (mmW) system, since a wavelength is short, multiple antenna elements may be installed in the same area. That is, considering that the wavelength at 30 GHz band is 1 cm, a total of 100 antenna elements may be installed in a 5 by 5 cm panel at intervals of 0.5 lambda (wavelength) in the case of a 2-dimensional array. Therefore, in the mmW system, it is available to improve the coverage or throughput by increasing the beamforming (BF) gain using multiple antenna elements.

In this case, in the case that each antenna element may include a transceiver unit (TXRU) to enable adjustment of transmit power and phase, independent beamforming per frequency resource is available. However, installing TXRUs in all of the about 100 antenna elements is less feasible in terms of cost. Therefore, a method of mapping a plurality of antenna elements to one TXRU and adjusting a direction of a beam using an analog phase shifter has been considered. However, the analog beamforming method is disadvantageous in that frequency selective beamforming is impossible because only one beam direction is generated over the entire band.

As an intermediate form of digital beamforming (BF) and analog beamforming (BF), hybrid BF with B TXRUs that are fewer than Q antenna elements may be considered. In this case, the number of beam directions that can be transmitted at the same time is limited to B or less, which depends on the connection scheme of B TXRUs and Q antenna elements.

Hereinafter, the present disclosure will be described.

The aforementioned D2D communication may be extended and applied to signal transmission/reception between vehicles, and communication related to vehicles is specifically called V2X (vehicle-to-everything) communication. In V2X, the term "X" is pedestrian (communication between a vehicle and a device carried by an individual), vehicle (communication between vehicles) (V2V), infrastructure/network (communication between a vehicle and a roadside unit (RSU)/network (ex) RSU is a transportation infrastructure entity (ex) an entity transactions or a stationary UE)) (V2I/N), etc. A device (related to V2P communication) possessed by a pedestrian (or person) is named "P-UE", and a device (related to V2X communication) installed in a vehicle is named "V-UE". In the present disclosure, the term "ENTITY" may be interpreted as at least one of P-UE, V-UE, and RSU (/network/infrastructure).

Here, for example, a V2X communication mode may be (A) a mode operating based on a BS instruction, for example, according to LTE(A), (on a V2X resource pool which is preconfigured(/signaled) (from a BS/(network))) a mode (MODE#3) in which a BS signals(/controls) scheduling information related to V2X message transmission(/reception) (e.g., a UE located within a BS communication coverage (and/or in RRC CONNECTED state) may be a main target).

And/or, for example, a V2X communication mode may be (B) a mode in which a UE having a degree of freedom operates based on a sensing, for example, according to LTE(A), (on a V2X resource pool which is preconfigured(/signaled) (from a BS/(network))) a mode (MODE#4) in which a UE (autonomously) determines(/controls) scheduling information related to V2X message transmission(/reception) (e.g., a UE located within/outside of a BS communication coverage (and/or in RRC CONNECTED/IDLE state) may be a main target).

Here, as an example, in the present disclosure, the wording "sensing operation" may be interpreted as a PSSCH DM-RS sequence-based PSSCH-RSRP measurement operation (scheduled by a decoding-successful PSCCH) and/or a (V2X resource pool-related subchannel-based) S-RSSI measurement operation.

Hereinafter, types of V2X services and requirements therefor will be briefly described with reference to the drawings.

Figure 13:
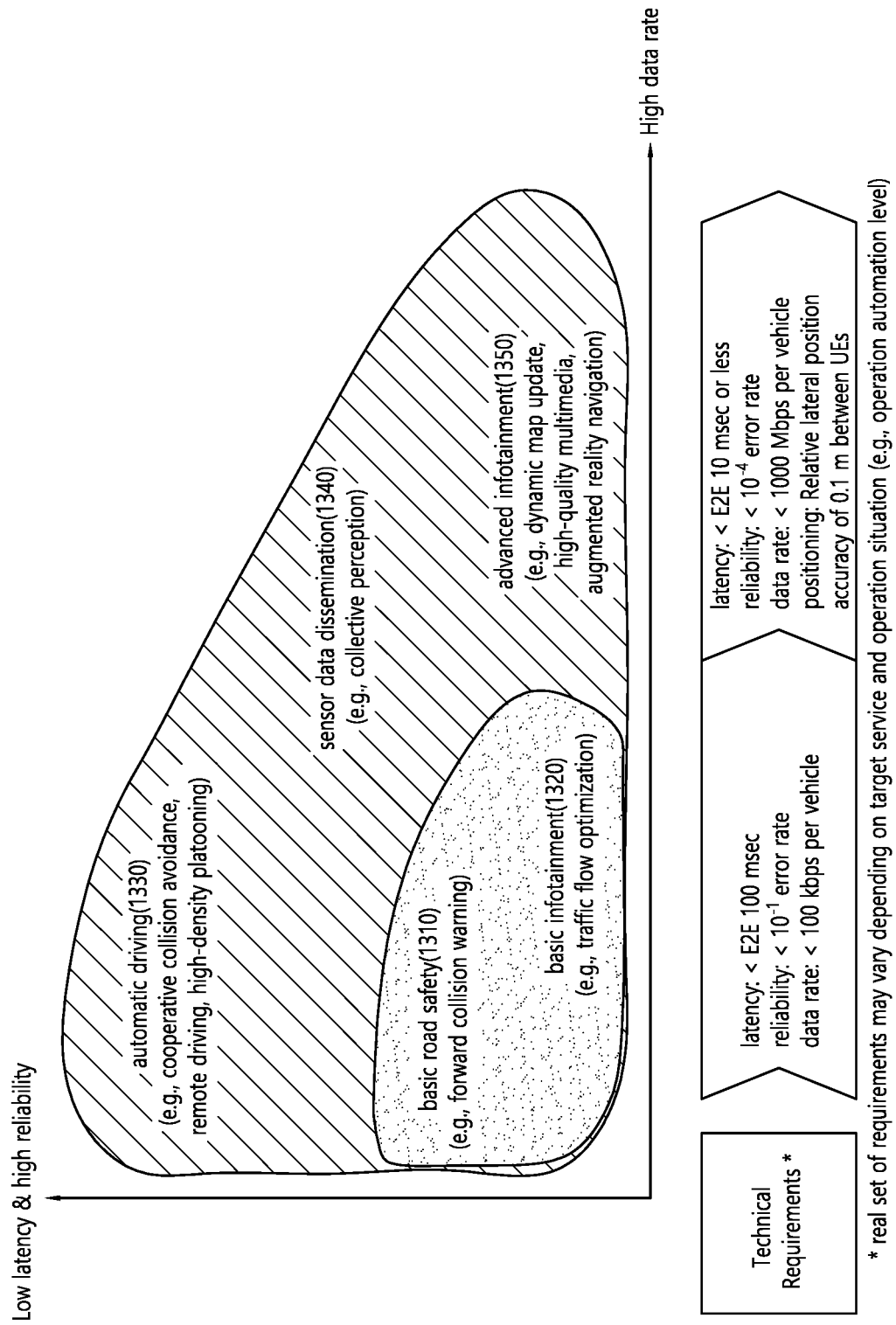
FIG. 13 schematically shows the types of V2X services and requirements for them.

FIG. 13 schematically shows the types of V2X services and requirements for them.

According to FIG. 13, the types of services supported by V2X may be expressed as a graph in which one axis (i.e., a vertical axis in FIG. 13) represents latency and reliability and the other axis (i.e., a horizontal axis in FIG. 13) represents data rate.

First, as an example of the types of services supported by V2X, there may be use cases such as latency less than E2E (end-to-end) 100 msec, reliability less than 10-1 error rate and/or basic road safety 1310 requiring a data rate less than 100 kbps per vehicle, and/or basic infotainment 1320.

Here, an example of the basic road safety 1310 may include a forward collision warning or the like. An example of the basic infotainment 1320 may include traffic flow optimization or the like.

In addition, as another example of the types of services supported by V2X, there may be use cases such as latency less than E2E 10 msec, reliability less than 10-4 error rate, a data rate less than 1000 Mbps per vehicle, automated driving 1330 requiring relative position accuracy of 0.1 m between terminals, sensor data dissemination 1340, and/or advanced infotainment 1350.

Here, examples of the automated driving 1330 may include cooperative collision avoidance, remote driving, high-density platooning, and the like. Examples of the sensor data dissemination 1340 may include collective perception or the like. Examples of the advanced infotainment 1350 may include dynamic map update, high-quality multimedia, augmented reality navigation, and the like.

Meanwhile, in a next-generation communication system, various use cases may be supported. For example, services for communication such as autonomous vehicles, smart cars, or connected cars may be considered. For these services, each vehicle may exchange information as a communicatable terminal, select resources for communication with or without a help of a BS, and exchange messages between terminals.

Hereinafter, the present disclosure proposes a new method for transmitting control information in a vehicle to everything communication.

The present disclosure proposes a novel method for reducing transmission errors or channel estimation errors while increasing reliability when transmitting messages or feedback information in vehicle to everything communication.

In the present disclosure, the inventive matters and/or embodiments may be regarded as one proposed method, but a combination between each inventive matter and/or embodiments may also be considered as a new method. In addition, the inventive matters are not limited to the embodiments presented in the present disclosure and are not limited to a specific system. In the case of all (parameter) and/or (operation) and/or (combination between each parameter and/or operation) and/or (whether the corresponding parameter and/or operation is applied) and/or (whether a combination of each parameter and/or operations is applied), the BS may set (in advance) for the terminal through higher layer signaling and/or physical layer signaling or may be defined in a system in advance.

In addition, the features of the present disclosure may be defined as respective operation modes, and a BS may (pre)configure one of them to a UE through a higher layer signaling and/or a physical layer signaling, and accordingly, the BS may operate the corresponding operation mode. Furthermore, for the convenience of description, the present disclosure describes the control information transmitted in a control channel, but this may be applied to other various types of information (e.g., data transmitted in a data channel).

The TTI of the present disclosure may correspond to a unit of various lengths such as a sub-slot/slot/subframe or a basic unit which is a basic unit of transmission, and the terminal of the present disclosure may correspond to various types of devices, such as a vehicle and a pedestrian terminal.

In Sidelink, a UE may transmit a scheduling assignment (SA) including information such as a modulation and coding scheme (MCS) required for decoding a resource location used for transmitting a data channel or other data channels and a MIMO transmission scheme, and this may be transmitted on a resource pool which is separately configured for the SA. Here, the SA may mean a sort of control information, for example. Further, the SA may also be referred to as scheduling information in another expression.

In this case, the SA may be transmitted in accordance with a predefined resource size or a basic unit. Alternatively, the SA may be transmitted with more resources by repeating the resource size or the basic unit on a time axis and/or a frequency axis for improving the transmission reliability. Through this, the SA may be transmitted with lower code rate or accumulated time axis energy, and there is an effect that the reliability may be improved.

Hereinafter, for the convenience of understanding, a basic unit is schematically described with reference to a drawing.

Figure 14:
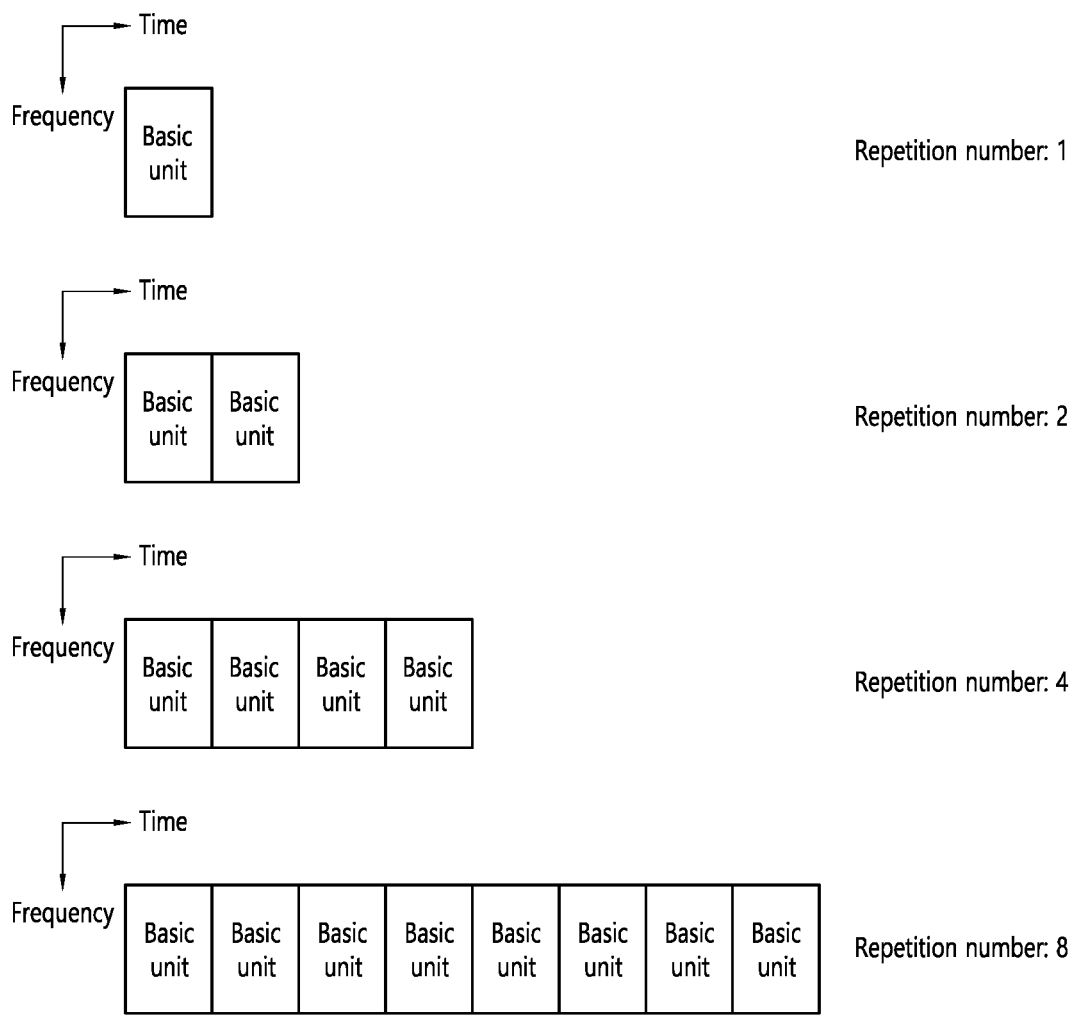
FIG. 14 schematically illustrates an example of a repeated transmission of a basic unit.

FIG. 14 schematically illustrates an example of a repeated transmission of a basic unit.

Referring to FIG. 14, a basic unit may be defined on time and frequency dimensions. Here, the basic unit may correspond to a basic unit of transmission as described above, and the basic unit of transmission may correspond to various lengths on a time axis and a frequency axis.

Here, the basic unit may be repeatedly transmitted a preconfigured number of times. As shown in FIG. 14, the basic unit may be transmitted once or repeatedly transmitted by two times, four times, or eight times. However, the number of repeated transmissions of the basic unit is not limited to the example shown in FIG. 14, and the basic unit may be repeatedly transmitted a various number of times.

In this case, an information bit is encoded in accordance with a unit of the basic unit, and the basic unit may be configured in the form in which a corresponding encoded bit is repeated, or an information bit is encoded in accordance with the entire resource size in which the basic unit is repeated, and the basic unit is mapped throughout the entire corresponding resource.

Meanwhile, in the case of information that requires higher reliability according to a service requirement of the information to be transmitted by a UE, the UE may transmit the SA for scheduling the information by using more resources by extending resources on a time axis and/or a frequency axis as in the scheme described above.

In this case, in the aspect of a reception UE, when transmission UEs transmit the scheduling assignment (SA), since the reception UE is unable to know which service is targeted when the transmission UEs configure and transmit the SA, the reception UE needs to perform a blind decoding (BD) for various assumptions.

Since such a BD may cause additional latency and power consumption, the assumption (e.g., the number of repeatable basic units and/or a repeated domain (on time axis/frequency axis) on whether the SA is transmitted may be predefined in a system or preconfigured, or (pre)configured to a UE through a higher layer signaling and/or a physical layer signaling by a BS.

However, even though the assumption on whether the SA is transmitted is predefined in a system or (pre)configured to a UE through a higher layer signaling and/or a physical layer signaling by a BS, the reception UE still needs to perform a BD for the corresponding configuration.

For example, for higher reliability in transmission of the SA by a transmission UE, in the case that a UE is configured to transmit a predefined resource size or a basic unit repeatedly on a time axis, and 1, 2, 4, and 8 are configured as possible repetition numbers, the reception UE needs to perform a BD by assuming a resource size and an encoding scheme in accordance with the corresponding configuration, and therefore, a way is required to further reduce the latency and the power consumption therefor.

Therefore, the present disclosure proposes a method for reducing the latency for performing a BD and the power consumption therefor and by reducing the number of BDs performed by the reception UE, which is described below with reference to a drawing.

In this connection, the terminal (e.g., apparatus) may be as follows.

The apparatus may be an (autonomous driving) apparatus that communicates with at least one of a mobile terminal, a network, and another autonomous vehicle other than the apparatus.

Alternatively, the apparatus may be an (autonomous driving) apparatus that implements at least one ADAS (Advanced Driver Assistance System) function based on a signal that controls the motion of the apparatus.

Alternatively, the apparatus may be an (autonomous driving) apparatus that receives a user's input and switches a driving mode of the apparatus from an autonomous driving mode to a manual driving mode or from a manual driving mode to an autonomous driving mode.

Alternatively, the apparatus drives may be an (autonomous driving) apparatus autonomously driving based on external object information, wherein the external object information includes at least one of information on presence or absence of an object, location information of the object, distance information between the apparatus and the object, and relative speed information between the apparatus and the object.

Figure 15:
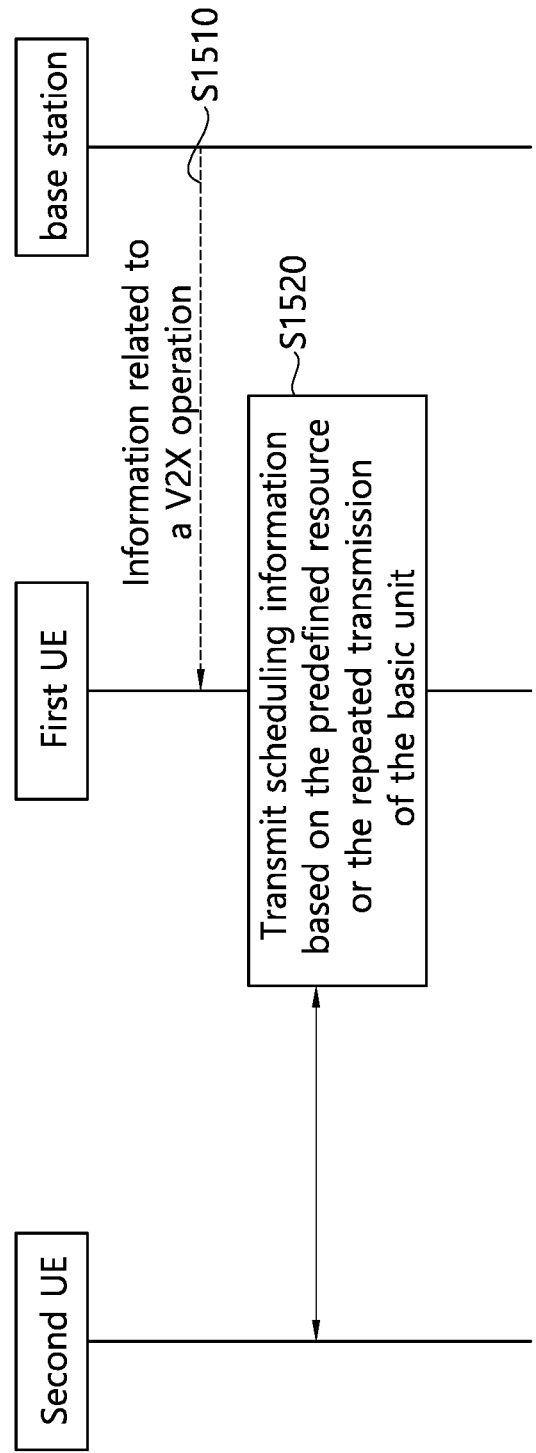
FIG. 15 is a flowchart illustrating a method for transmitting scheduling information based on a repeated transmission of a predefined resource or a basic unit according to an embodiment of the present disclosure.

FIG. 15 is a flowchart illustrating a method for transmitting scheduling information based on a repeated transmission of a predefined resource or a basic unit according to an embodiment of the present disclosure.

Referring to FIG. 15, a UE may receive information related to a V2X operation from a BS (step, S1510). Here, for example, the information related to a V2X operation may correspond to the information (e.g., assumption on whether an SA is transmitted, etc.) transmitted by the BS to the UE.

In addition, for example, a configuration related to a transmission of the scheduling information may be configured by the BS or preconfigured to the UE.

Here, the information related to a V2X operation may be transmitted through a higher layer signaling (or physical layer signaling) of the UE, and in this case, the information related to a V2X operation may be signaled in a dedicated manner or broadcasted. Here, for example, the higher layer signaling may be an application layer signaling, L3 signaling, L2 signaling, and the like. For example, the physical layer signaling may be L1 signaling.

Meanwhile, the information related to a V2X operation is not necessarily received from the BS. For example, the information related to a V2X operation may be preconfigured to the UE.

Further to the example described above, a specific example for the information related to a V2X operation will be described below for the convenience of description.

Here, the predefined resource may mean a resource having a specific size on a time and a frequency related to an SA transmission, and the example of the basic unit is as described above.

In this case, the predefined resource or the basic unit may be included in the information related to a V2X operation described above.

The UE may transmit the scheduling information based on the repeated transmission of the basic unit or the predefined resource (step, S1520). The UE may transmit the scheduling information by reflecting index information of a sequence which is applied to a reference signal related to the transmission of the scheduling information. The index information may be (pre)configured through a higher layer signaling or physical layer signaling by the BS to the UE and may have different values depending on the number of the repeated transmissions, a transmission timing of the scheduling information, or a transmission type. Furthermore, here, the reference signal may mean a Demodulation reference signal (DMRS).

In one example, the UE shown in FIG. 15 may receive the configuration related to the transmission of the scheduling information (e.g., index information configuration of a sequence applied to a reference signal which is transmitted together for transmitting the scheduling information through a higher layer signaling or physical layer signaling. The detailed description therefor will be described below.

In one example, the configuration related to the transmission of the scheduling information may be preconfigured to the UE. The detailed description therefor will be described below.

In one example, the index information may be a cyclic shift (CS) index. The detailed description therefor will be described below.

In one example, the UE may inform another UE of a starting time and/or an ending time of the transmission of the scheduling information and/or a repetition number implicitly through the transmission of scheduling information on which the index information of the sequence is reflected. The detailed description therefor will be described below.

In one example, the index information may be configured as the number related to the greatest transmission number among the allowed repeated transmission number of the scheduling information. The detailed description therefor will be described below.

In one example, the index information may have different values depending on the number of the repeated transmissions and the transmission timing of the scheduling information. The detailed description therefor will be described below.

In one example, the UE may inform another UE of a starting time and/or an ending time of the transmission of the scheduling information and/or the repetition number implicitly through the transmission of scheduling information on which the index information of the sequence is reflected. The detailed description therefor will be described below.

In one example, the scheduling information may be repeatedly transmitted 1, 2, 3, or 4 times. In the case that the number of repeated transmissions is 1: when a starting time of the transmission of the scheduling information is a first transmission time, the index information has a first value, when a starting time of the transmission of the scheduling information is a second transmission time, the index information has a second value, when a starting time of the transmission of the scheduling information is a third transmission time, the index information has a third value, and when a starting time of the transmission of the scheduling information is a fourth transmission time, the index information has a fourth value. In the case that the number of repeated transmissions is 2: when a starting time of the transmission of the scheduling information is a first transmission time, the index information has a second value, when a starting time of the transmission of the scheduling information is a second transmission time, the index information has a third value, when a starting time of the transmission of the scheduling information is a third transmission time, the index information has a fourth value, and when a starting time of the transmission of the scheduling information is a fourth transmission time, the index information has a first value. In the case that the number of repeated transmissions is 3: when a starting time of the transmission of the scheduling information is a first transmission time, the index information has a third value, when a starting time of the transmission of the scheduling information is a second transmission time, the index information has a fourth value, when a starting time of the transmission of the scheduling information is a third transmission time, the index information has a first value, and when a starting time of the transmission of the scheduling information is a fourth transmission time, the index information has a second value. In the case that the number of repeated transmissions is 4: when a starting time of the transmission of the scheduling information is a first transmission time, the index information has a fourth value, when a starting time of the transmission of the scheduling information is a second transmission time, the index information has a first value, when a starting time of the transmission of the scheduling information is a third transmission time, the index information has a second value, and when a starting time of the transmission of the scheduling information is a fourth transmission time, the index information has a third value. The first value, the second value, the third value, and the fourth value may be different values. Here, the first value may be 0, the second value may be 3, the third value may be 6, and the fourth value may be 9. The detailed description therefor will be described below.

Hereinafter, the example shown in FIG. 15 is described in more detail.

Depending on a predefined resource size for an SA and/or a repetition number of a basic unit, and/or a transmission start time of an SA, and/or a transmission type (e.g., unicast/groupcast/broadcast), a root index of a sequence applied to a DMRS of the SA transmission (i.e., base sequence type) and/or a cyclic shift (CS) index, and/or an orthogonal cover code (OCC) may be differently applied.

For example, when the UE transmits the SA, in the case that the repetition number of a basic unit or the predefined resource size for an SA is predefined or preconfigured as 1, 2, 3, and 4, the UE may transmit the SA by corresponding the CS index of a sequence applied to a DMRS of the SA transmission that corresponds to each repeated transmission number to 0, 3, 6, and 9.

The configuration may be predefined in a system or (pre)configured to the UE through a higher layer signaling and/or a physical layer signaling by a BS.

When the operation is applied, a reception UE may know the repeated transmission number by performing a BD for the CS index only for a DMRS sequence before performing a decoding for each of repeated transmission number assumptions, and only needs to perform a decoding once by assuming the corresponding repeated transmission number. Therefore, latency and the power consumption therefor may be further reduced.

However, when the method is indiscriminately applied, if the repeated transmission number is applied two or more times, an ambiguity may occur. Hereinafter, an example of the case in which an ambiguity occurs is described with reference to a drawing.

Figure 16:
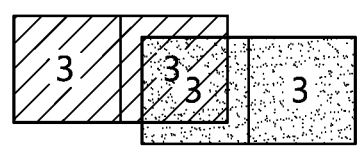
FIG. 16 schematically illustrates an example of the case in which an ambiguity occurs.

FIG. 16 schematically illustrates an example of the case in which an ambiguity occurs.

In FIG. 16, the case of a timing index may be applied in various manners such as a symbol unit, a slot unit, or a subframe unit and may mean a time axis resource unit which is defined for an SA transmission.

As shown in FIG. 16, in the case that a repeated transmission number is set to 2, and CS index 3 is applied to the repeated transmission number, a value of CS index for SA 1 may be 3 in timing index #0 and timing index #1, and a value of CS index for SA 2 may also be 3 in timing index #1 and timing index #2.

In the above situation, even in the case that a reception UE performs a BD for a CS index of a DMRS on timing index #1 point and detects a DMRS to which CS index 3 is applied, an ambiguity on whether the transmission starts on timing index #0 point or timing index #1 point may occur.

Therefore, further, in the method described above, a corresponding relation between the repetition transmission number of a basic unit and/or the predefined resource size for an SA and the CS index of a sequence applied to a DMRS may be defined differently depending on a timing index on which the transmission starts.

For example, as in the example shown in FIG. 17 to be described below, a corresponding relation between the repetition transmission number and the CS index may be defined differently depending on a timing on which the transmission starts.

FIG. 17 schematically illustrates an example for a CS index value depending on the timing on which the transmission starts and the repetition transmission number.

Referring to FIG. 17, when a repetition number is 1, a value of the CS index may be as described in the following example. When a value of a starting timing index is 0, a value of the CS index may be 0, when a value of a starting timing index is 1, a value of the CS index may be 3, when a value of a starting timing index is 2, a value of the CS index may be 6, and when a value of a starting timing index is 3, a value of the CS index may be 9.

For example, when a repetition number is 2, a value of the CS index may be as described in the following example. When a value of a starting timing index is 0, a value of the CS index may be 3, when a value of a starting timing index is 1, a value of the CS index may be 6, when a value of a starting timing index is 2, a value of the CS index may be 9, and when a value of a starting timing index is 3, a value of the CS index may be 0.

For example, when a repetition number is 3, a value of the CS index may be as described in the following example. When a value of a starting timing index is 0, a value of the CS index may be 6, when a value of a starting timing index is 1, a value of the CS index may be 9, when a value of a starting timing index is 2, a value of the CS index may be 0, and when a value of a starting timing index is 3, a value of the CS index may be 3.

For example, when a repetition number is 4, a value of the CS index may be as described in the following example. When a value of a starting timing index is 0, a value of the CS index may be 9, when a value of a starting timing index is 1, a value of the CS index may be 0, when a value of a starting timing index is 2, a value of the CS index may be 3, and when a value of a starting timing index is 3, a value of the CS index may be 6.

The example of FIG. 17 may be illustrated in a different scheme as below.

Figure 18:
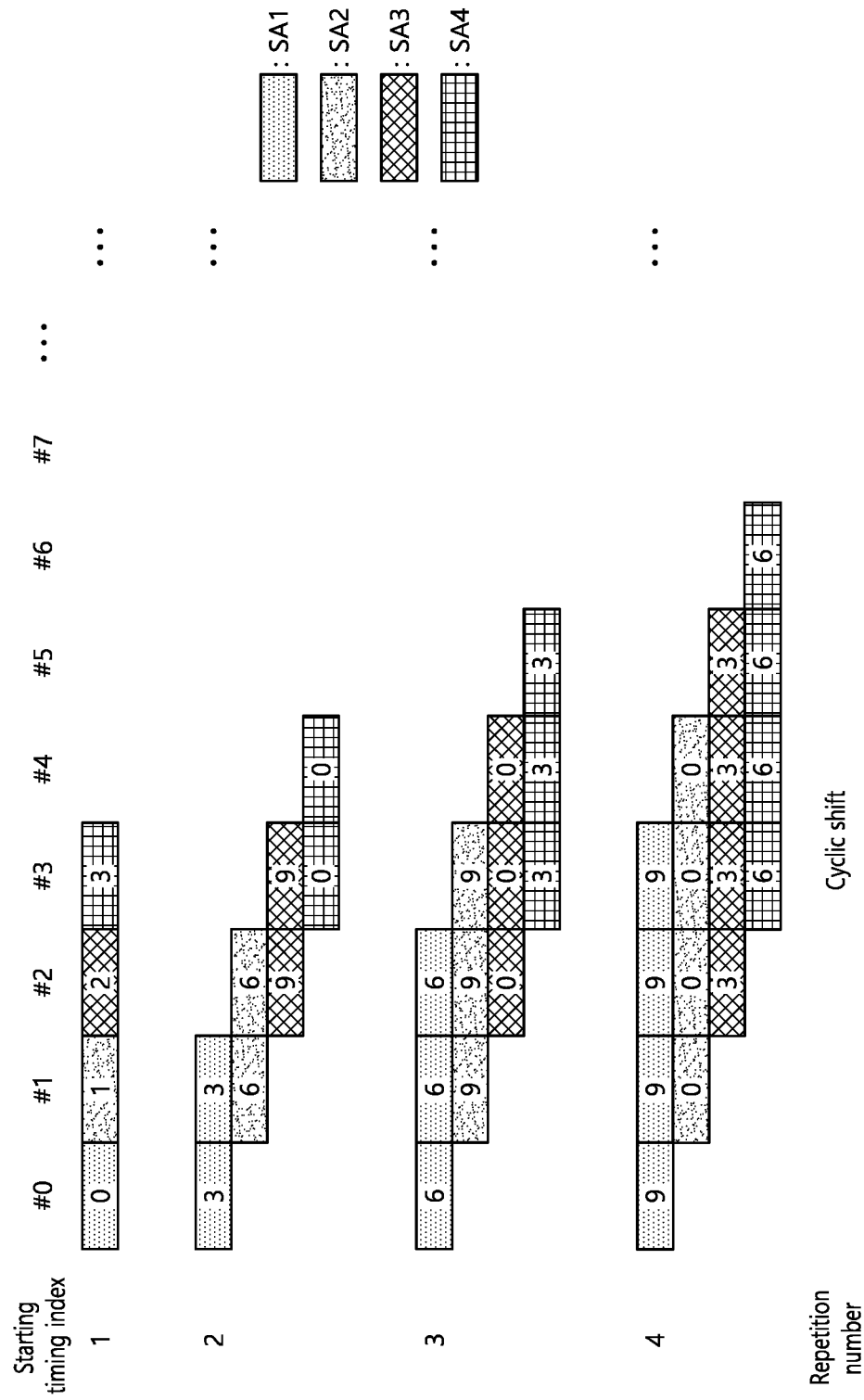
FIG. 18 illustrates an example for a CS index value depending on the timing on which the transmission starts and the repetition transmission number in a different scheme.
Figure 20A:
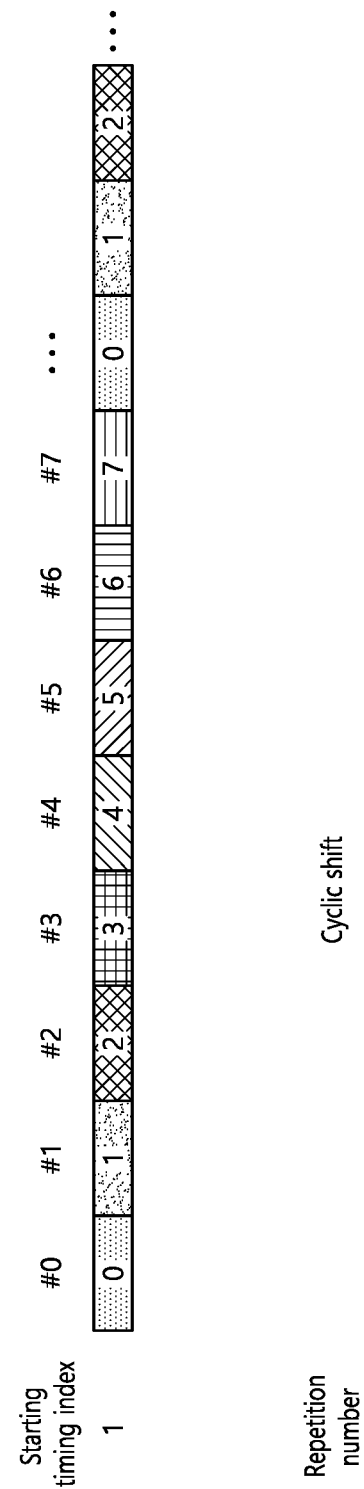
Figure 20B:
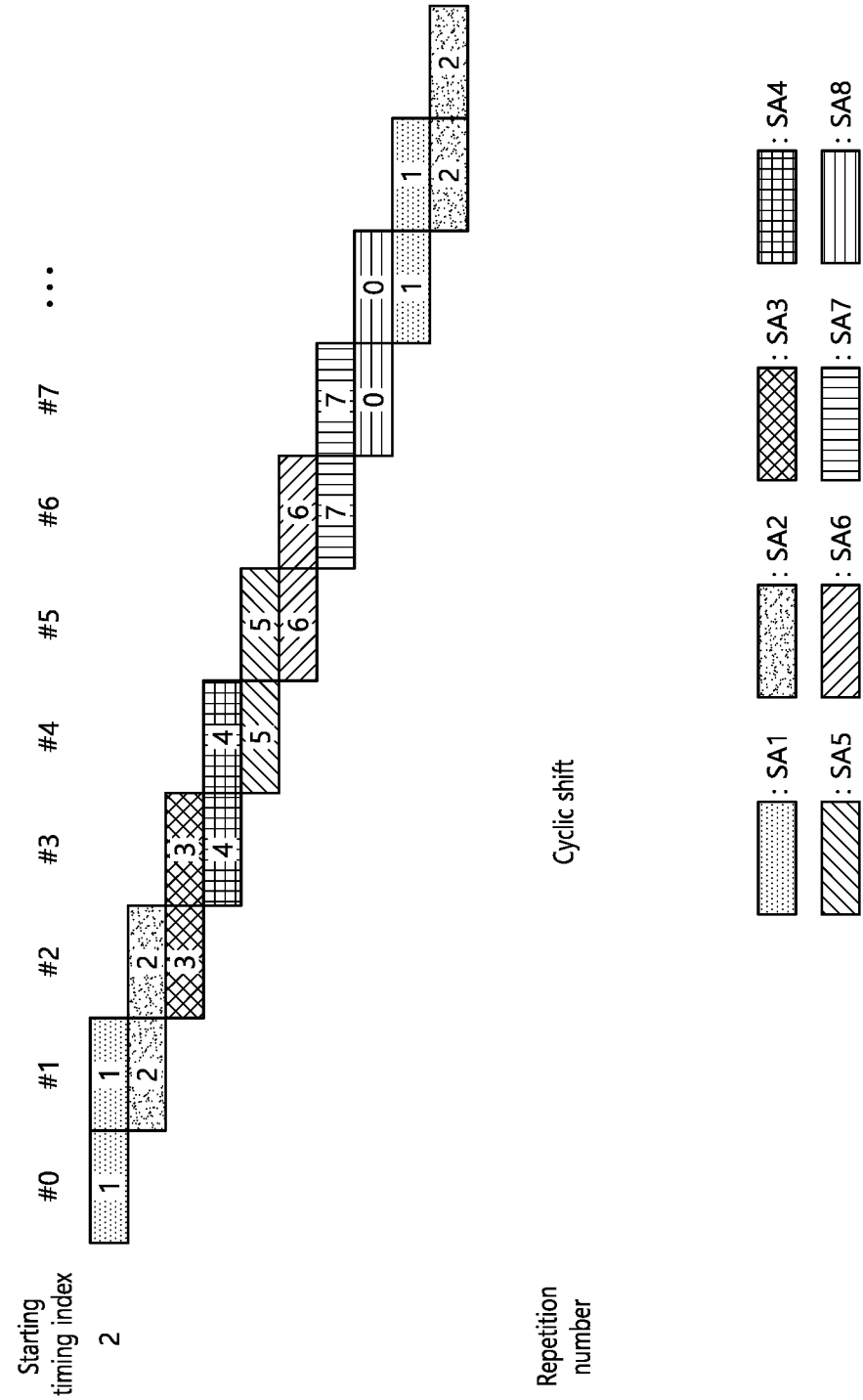
Figure 20D:
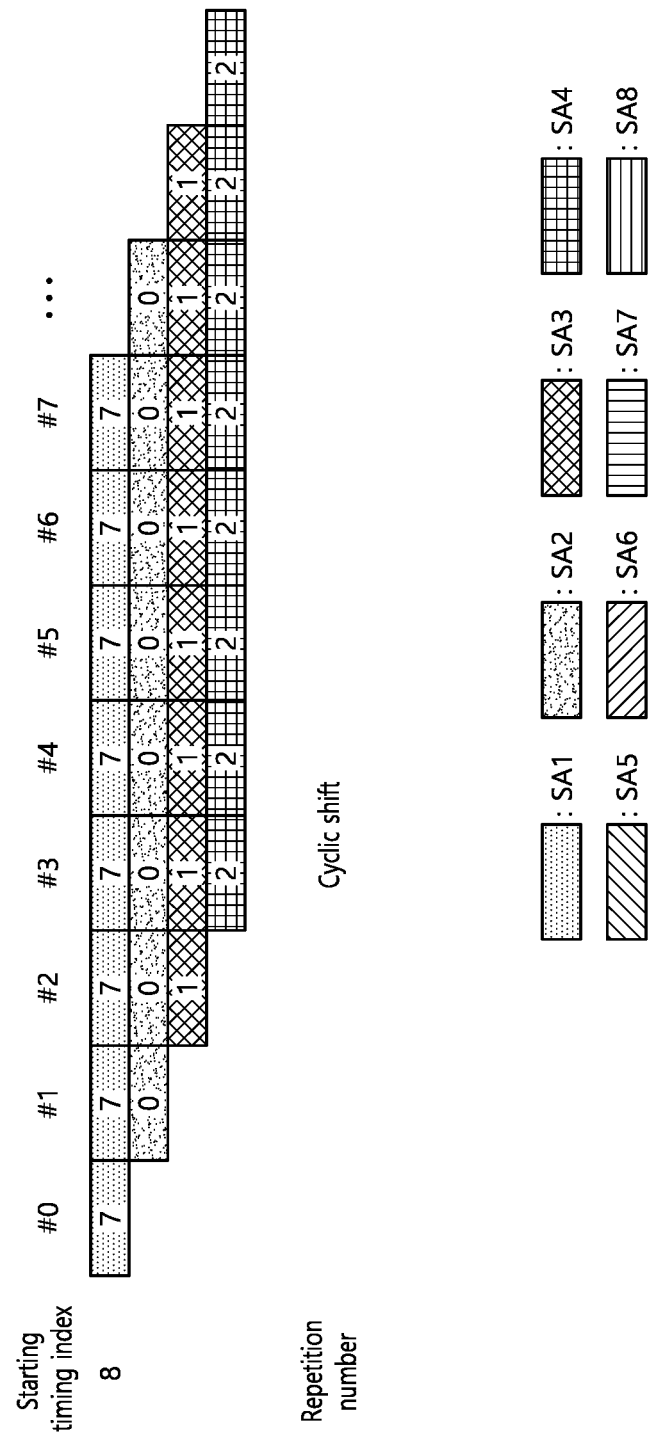

FIG. 18 illustrates an example for a CS index value depending on the timing on which the transmission starts and the repetition transmission number in a different scheme.

According to the examples shown in FIG. 17 and FIG. 18, the ambiguity problem between SAs transmitted in the same repetition number may be solved. In the operation according to the examples shown in FIG. 17 and FIG. 18, a sequence having a specific CS index value is detected through a BD for a DMRS, and the ambiguity does not occur for the point on which a transmission of an SA to which the DMRS is applied.

For example, in the example shown in FIG. 18, in the situation in which a transmission UE performs a transmission by applying repetition number 3 and CS index 6 in timing index #0, in the case that a reception UE succeeds in a detection for CS index 6 in timing index #1 (although the reception UE fails to detect for CS index 6 in timing index #0), the reception UE may assume that the SA is transmitted up to timing index #2 and perform a decoding.

In other words, even in the case that the reception UE fails to decode the SA in timing index #0, the reception UE may try to decode an SA in timing #1 or timing #2.

In the example shown in FIG. 17 and FIG. 18 above, the example that the UE repeatedly transmits an SA 1, 2, 3, or 4 times, for the convenience of understanding. Here, the example for the UE to transmit an SA repeatedly is not limited to the example above. For example, the UE may repeatedly transmit an SA 1, 2, 4, or 8 times, and the example therefor may be described with reference to the following drawing.

FIG. 19 schematically another example for a CS index value depending on the timing on which the transmission starts and the repetition transmission number.

Referring to FIG. 19, when a repetition number is 1, a value of the CS index may be as described in the following example. When a value of a starting timing index is 0, a value of the CS index may be 0, when a value of a starting timing index is 1, a value of the CS index may be 2, when a value of a starting timing index is 2, a value of the CS index may be 2, when a value of a starting timing index is 3, a value of the CS index may be 3, when a value of a starting timing index is 4, a value of the CS index may be 4, when a value of a starting timing index is 5, a value of the CS index may be 5, when a value of a starting timing index is 6, a value of the CS index may be 6, and when a value of a starting timing index is 7, a value of the CS index may be 7.

For example, when a repetition number is 8, a value of the CS index may be as described in the following example. When a value of a starting timing index is 0, a value of the CS index may be 7, when a value of a starting timing index is 1, a value of the CS index may be 0, when a value of a starting timing index is 2, a value of the CS index may be 1, when a value of a starting timing index is 3, a value of the CS index may be 2, when a value of a starting timing index is 4, a value of the CS index may be 3, when a value of a starting timing index is 5, a value of the CS index may be 4, when a value of a starting timing index is 6, a value of the CS index may be 5, and when a value of a starting timing index is 7, a value of the CS index may be 6.

In the example shown in FIG. 19, since the case a repetition number is 2 and the case that a repetition number is 4 are also shown in the drawing, the description therefor is omitted for the convenience of description.

The example of FIG. 19 may be illustrated in a different scheme as below.

FIGS. 20A to 20D illustrate another example for a CS index value depending on the timing on which the transmission starts and the repetition transmission number in a different scheme.

For example, in the examples shown in FIG. 20A to FIG. 20D, in the situation in which a transmission UE performs a transmission by applying repetition number 8 and CS index 7 in timing index #0, in the case that a reception UE succeeds in a detection for CS index 7 in timing index #1 (although the reception UE fails to detect for CS index 7 in timing index #0), the reception UE may assume that the SA is transmitted up to timing index #7 and perform a decoding.

In other words, even in the case that the reception UE fails to decode the SA in timing index #0, the reception UE may try to decode an SA in timing #1 or timing #7.

The scheme of the present disclosure is not limited to the example, and may be generalized as follows: by applying the number of CS indices (e.g., a total of 8 CS indices when a repeated transmission is available for up to 8 times) that corresponds to the greatest repeated transmission number among the allowed repeated transmission number of an SA, while a UE may reduce the number of BDs for the SA, the UE may implicitly know a timing on which a transmission starts and a repetition transmission number.

More particularly, a CS index may be allocated differently according to each transmission starting point for the smallest repeated transmission number among the allowed repeated transmission number of an SA (e.g., 1). In the case of a repeated transmission number greater than the smallest repeated transmission number, a CS index may be allocated differently according to each transmission starting point, but a CS is allocated, which is the same as the CS index allocated to be used when the smallest repeated transmission number starts on the timing based on the last transmission timing of the repeated transmission number. Therefore, the UE may know a period during which a repeated transmission of the transmission is performed through a sequence detection of a specific time, and the ambiguity in the case shown in FIG. 16 may be removed.

The CS index according to the repetition transmission number of an SA and the transmission starting timing may be predefined in a system or (pre)configured to a UE through a higher layer signaling and/or a physical layer signaling by a BS.

This may be particularly beneficial in the case that a repeated transmission of an SA is configured in the form in which an information bit is encoded in accordance with a preconfigured resource size for an SA and/or a basic unit, and the corresponding encoded bit is repeated. In the case that a repeated transmission of an SA is configured in the form in which an information bit is encoded in accordance with a preconfigured resource size for an SA and/or an entire resource size in which a basic unit is repeated and mapped throughout the corresponding entire resources, in order to increase a decoding probability in accordance with the operation, a systematic bit of the encoded bit may be mapped in a frequency first scheme from a rear part of the repeated transmission.

In addition, the systematic bit of the encoded bit may be mapped in a time first scheme throughout a region in which the repeated transmission is performed, and there is a diversity effect.

In the operation, an operation for randomizing an interference may be further considered. For example, in the operation, a CS index may be replaced by a root index, and CS indices 0, 3, 6, and 9 may be randomly selected by each UE in the sequence in which each root index is applied, and the sequence may be generated and transmitted.

Alternatively, the operation is applied without any change, but a plurality of different root indices is corresponded for each CS index, and accordingly, one of the root indices may be randomly selected by each UE, and the sequence may be generated and transmitted.

As described above, the scheme of the present disclosure is not limited to the embodiment. For example, a CS index may be applied in various manners, except 0, 3, 6, and 9, and the repeated transmission number may be interpreted corresponding to a transmission size.

Furthermore, in the case that a preconfigured resource size and/or a basic unit is repeatedly transmitted for an SA, a pattern of CS indices of a DMRS applied for each basic unit may be defined.

A combination with the operation may also be considered. For example, a CS index may be configured differently depending on a starting timing of a repeated transmission, and a CS index may be applied in a specific pattern according to a repeated transmission number.

Furthermore, different OCCs may be applied to a DMRS according to a repeated transmission number. However, in the case that the OCC is applied in the state that the same CS index is applied for a repeated transmission, since a sequence may be wrongly detected by the influence of high Doppler for a DMRS sequence, the OCC may be applied in the state that different CS indices are applied for a repeated transmission.

Alternatively, the OCC may be applied after a CS index having a specific pattern according to a repeated transmission number is applied like in the operation. The pattern information may be predefined in a system or (pre)configured to a UE through a higher layer signaling and/or a physical layer signaling by a BS.

In addition, depending on a transmission type (e.g., unicast/groupcast/broadcast), a root index (i.e., basis sequency type) of a sequence applied to a DMRS of the corresponding SA transmission and/or a cyclic shift (CS) index and/or an orthogonal cover code (OCC) may be differently applied.

In this case, a reception UE may know information of a type of the SA transmission through a sequence detection of a DMRS.

This may be utilized to selectively decode a transmission type of which priority is high (e.g., the priority of the groupcast may be higher than the priority of the unicast, the priority of the broadcast may be higher than the priority of the groupcast, and a transmission type of higher priority may be preferentially tried to decode in the case that there is a restriction in a decoding capability), while reducing latency to the minimum in the case that there is a restriction on the decoding times within a limited time depending on a decoding capability of a UE.

In summary, in a situation in which the CS index mapping information according to a repeated transmission number and a starting point of scheduling information (e.g., FIG. 17 or FIG. 19) are preconfigured or configured by a BS and already known (by a transmission UE), the transmission UE may transmit the scheduling information by reflecting the corresponding CS index mapping information, and may inform a reception UE of a transmission period of the scheduling information implicitly. Accordingly, when the reception UE tries to decode the scheduling information, the reception UE may perform decoding fast without an additional BD through a sequence detection.

The example shown in FIG. 15 is described in the aspect of a UE as below.

Figure 21:
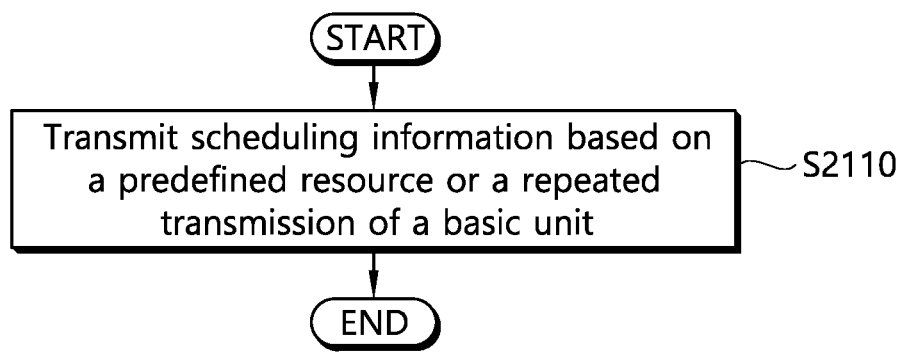
FIG. 21 is a flowchart illustrating a method for transmitting scheduling information based on a repeated transmission of a basic unit or a predefined resource in the aspect of a UE according to an embodiment of the present disclosure.

FIG. 21 is a flowchart illustrating a method for transmitting scheduling information based on a repeated transmission of a basic unit or a predefined resource in the aspect of a UE according to an embodiment of the present disclosure.

Referring to FIG. 21, a UE may transmit scheduling information based on a repeated transmission of a basic unit or a predefined resource (step, S2110). In this case, the UE may transmit the scheduling information by reflecting index information of a sequence applied to a reference signal related to a transmission of the scheduling information, the index information may be predefined in a system or (pre)configured to the UE through a higher layer signaling and/or a physical layer signaling by a BS, and the index information may have different values depending on the number of repeated transmissions, a transmission timing of the scheduling information, or a transmission type. Furthermore, here, the reference signal may mean a Demodulation reference signal (DMRS). The detailed description therefor is as described above, and the repeated description is omitted for the convenience of description.

Figure 22:
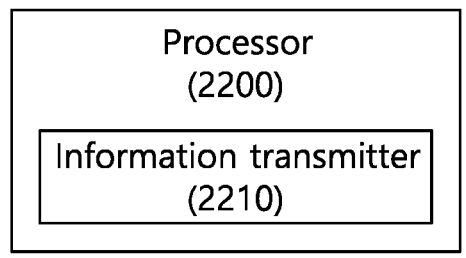
FIG. 22 is a block diagram illustrating a method for transmitting scheduling information based on a repeated transmission of a basic unit or a predefined resource in the aspect of a UE according to an embodiment of the present disclosure.

FIG. 22 is a block diagram illustrating a method for transmitting scheduling information based on a repeated transmission of a basic unit or a predefined resource in the aspect of a UE according to an embodiment of the present disclosure.

Referring to FIG. 22, a processor 2200 may include an information transmitter 2210. The processor 2200 may correspond to the processor shown in FIG. 25 to FIG. 31, for example.

The information transmitter 2210 may be configured to transmit scheduling information based on a repeated transmission of a basic unit or a predefined resource. In this case, the UE may transmit the scheduling information by reflecting index information of a sequence applied to a reference signal related to a transmission of the scheduling information, the index information may be predefined in a system or (pre)configured to the UE through a higher layer signaling and/or a physical layer signaling by a BS, and the index information may have different values depending on the number of repeated transmissions, a transmission timing of the scheduling information, or a transmission type. Furthermore, here, the reference signal may mean a Demodulation reference signal (DMRS). The detailed description therefor is as described above, and the repeated description is omitted for the convenience of description.

The example shown in FIG. 15 is described in the aspect of a BS as below.

Figure 23:
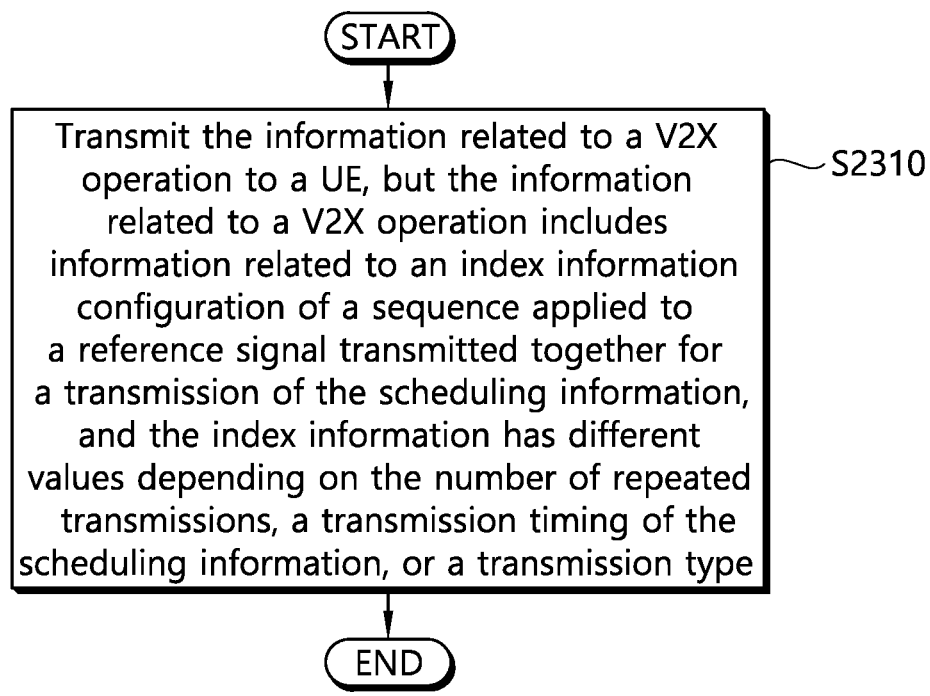
FIG. 23 is a flowchart illustrating a method for transmitting information related to a V2X operation in the aspect of a BS according to an embodiment of the present disclosure.

FIG. 23 is a flowchart illustrating a method for transmitting information related to a V2X operation in the aspect of a BS according to an embodiment of the present disclosure.

Referring to FIG. 23, a B S may transmit the information related to a V2X operation to a UE (step, S2310). In this case, the information related to a V2X operation may include information related to an index information configuration of a sequence applied to a reference signal transmitted together for a transmission of the scheduling information, and the index information may have different values depending on the number of repeated transmissions, a transmission timing of the scheduling information, or a transmission type. The detailed description therefor is as described above, and the repeated description is omitted for the convenience of description.

Figure 24:
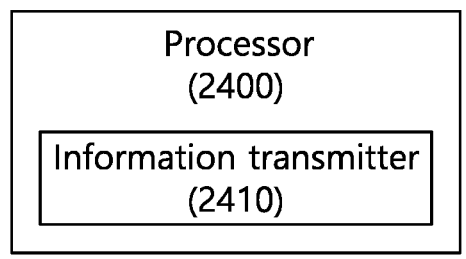
FIG. 24 is a block diagram illustrating an apparatus for transmitting information related to a V2X operation in the aspect of a BS according to an embodiment of the present disclosure.

FIG. 24 is a block diagram illustrating an apparatus for transmitting information related to a V2X operation in the aspect of a BS according to an embodiment of the present disclosure.

Referring to FIG. 24, a processor 2400 may include an information transmitter 2410. The processor 2400 may correspond to the processor shown in FIG. 25 to FIG. 31, for example.

The information transmitter 2410 may be configured to transmit the information related to a V2X operation to a UE. In this case, the information related to a V2X operation may include information related to an index information configuration of a sequence applied to a reference signal transmitted together for a transmission of the scheduling information, and the index information may have different values depending on the number of repeated transmissions, a transmission timing of the scheduling information, or a transmission type. The detailed description therefor is as described above, and the repeated description is omitted for the convenience of description.

Although not limited thereto, the various proposals of the present disclosure as described above may be applied to various fields requiring wireless communication/connection (e.g., 5G) between the apparatuses.

Hereinafter, the present disclosure will be illustrated in more detail with reference to the drawings. In the following drawings/descriptions, the same reference numerals may denote the same or corresponding hardware block, software block, or functional block, unless otherwise indicated.

Figure 25:
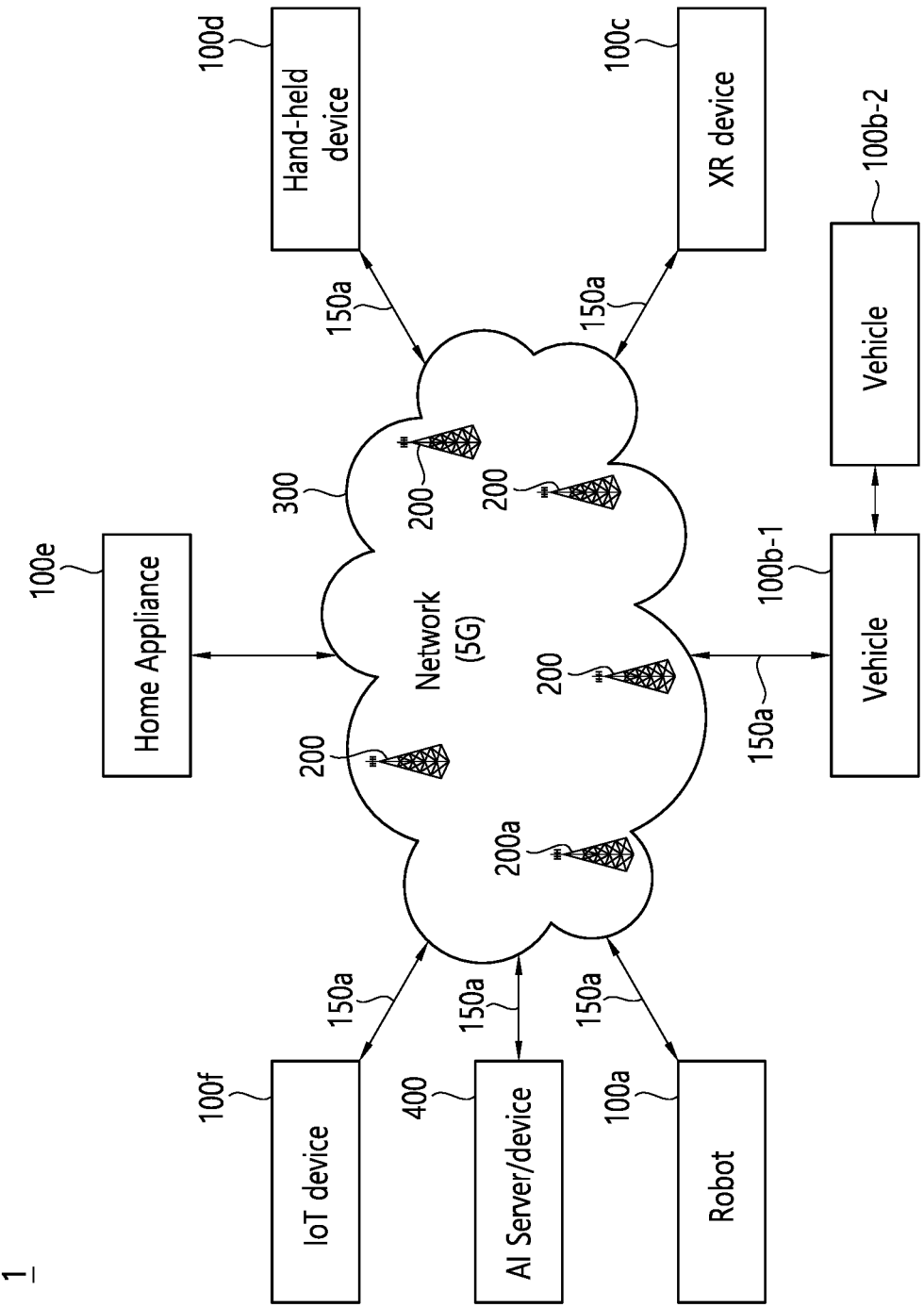
FIG. 25 illustrates a communication system 1 applied to the present disclosure.

FIG. 25 illustrates a communication system 1 applied to the present disclosure.

Referring to FIG. 25, a communication system 1 applied to the present disclosure includes a wireless device, a base station, and a network. Here, the wireless device refers to a device that performs communication using a wireless access technology (e.g., 5G new RAT (NR) or long term evolution (LTE) and may be referred to as a communication/wireless/5G device. Although not limited thereto, the wireless devices may include a robot 100a, vehicles 100b-1 and 100b-2, an extended reality (XR) device 100c, a hand-held device 100d, a home appliance 100e, an Internet of things (IoT) device 100f, and an AI device/server 400. For example, the vehicle may include a vehicle equipped with a wireless communication function, an autonomous vehicle, a vehicle capable of performing inter-vehicle communication, and the like. Here, the vehicle may include an unmanned aerial vehicle (UAV) (e.g., a drone). The XR device may include augmented reality (AR)/virtual reality (VR)/mixed reality (MR) devices and may be implemented in the form of a head-mounted device (HMD), a head-up display (HUD) TV provided in a vehicle, a smartphone, a computer, a wearable device, a home appliance, a digital signage, a vehicle, a robot, and the like. Portable devices may include a smartphone, a smart pad, a wearable device (e.g., smart watch, smart glasses), a computer (e.g., notebook computer), etc. Home appliances may include a TV, a refrigerator, and a washing machine. IoT devices may include a sensor, a smart meter, and the like. For example, the base station and the network may be implemented as a wireless device, and a specific wireless device 200a may operate as a base station/network node for other wireless devices.

The wireless devices 100a to 100f may be connected to a network 300 through a base station 200. An artificial intelligence (AR) technology may be applied to the wireless devices 100a to 100f, and the wireless devices 100a to 100f may be connected to the AI server 400 through the network 300. The network 300 may be configured using a 3G network, a 4G (e.g., LTE) network, or a 5G (e.g., NR) network. The wireless devices 100a to 100f may communicate with each other through the base station 200/network 300 but may communicate directly (e.g. sidelink communication) without passing through the base station/network. For example, the vehicles 100b-1 and 100b-2 may perform direct communication (e.g. V2V (vehicle to vehicle)/V2X (vehicle to everything) communication). In addition, an IoT device (e.g., sensor) may directly communicate with other IoT devices (e.g., sensors) or other wireless devices 100a to 100f.

Wireless communication/connections 150a and 150b may be established between the wireless devices 100a to 100f/ base station 200 and the base station 200/wireless devices 100a to 100f. Here, wireless communication/connection may be performed through various wireless access technologies (e.g., 5G NR) for uplink/downlink communication 150a and sidelink communication 150b (or D2D communication). Through the wireless communication/connection 150a and 150b, the wireless device and the base station/wireless device may transmit/receive wireless signals to each other. For example, the wireless communication/connections 150a and 150b may transmit/receive signals through various physical channels based on the entire/partial process of FIG. A1. To this end, based on various suggestions of the present disclosure, at least some of various configuration information configuring processes for transmission/reception of wireless signals, various signal processing processes (e.g., channel encoding/decoding, modulation/demodulation, resource mapping/demapping, etc.), and a resource allocation process, etc. may be performed.

Figure 26:
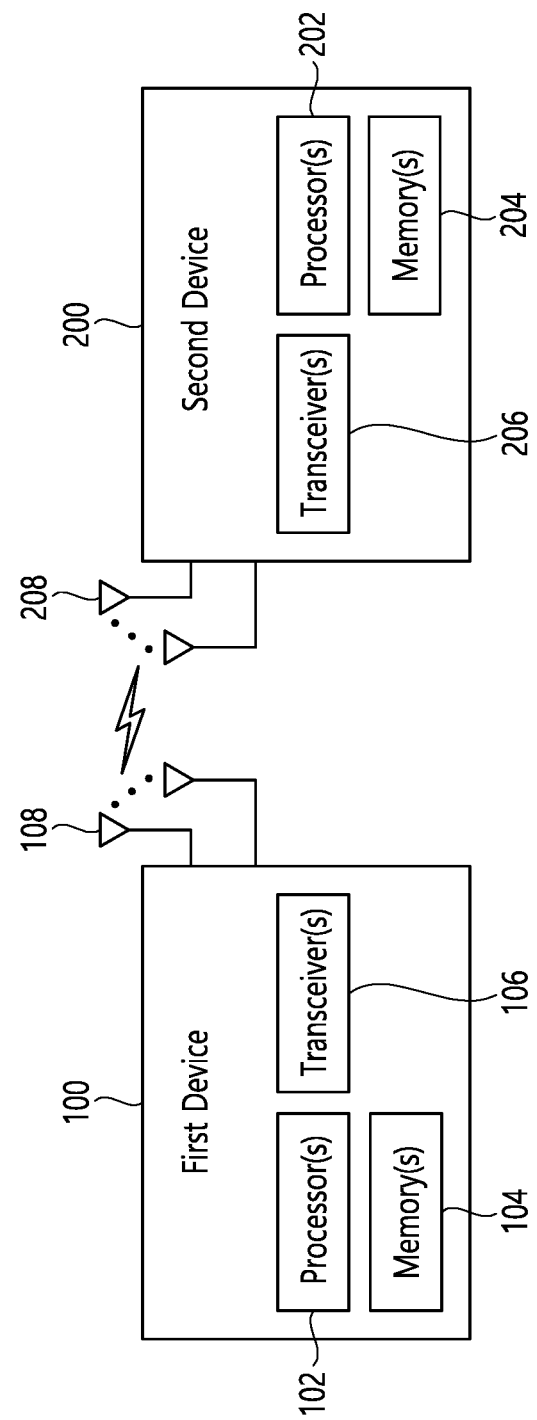
FIG. 26 illustrates a wireless device applicable to the present disclosure.

FIG. 26 illustrates a wireless device applicable to the present disclosure.

Referring to FIG. 26, a first device 100 and a second device 200 may transmit and receive wireless signals through various wireless access technologies (e.g., LTE and NR). Here, {the first device 100, the second device 200} may correspond to {wireless device 100x, base station 200} and/or {wireless device 100x, wireless device 100x) of FIG. 25}.

The first device 100 may include one or more processors 102 and one or more memories 104 and may further include one or more transceivers 106 and/or one or more antennas 108. The processor 102 may be configured to control the memory 104 and/or the transceiver 106 and may be configured to implement the functions, procedures, and/or methods described/suggested above. For example, the processor 102 may process information in the memory 104 to generate first information/signal and then transmit a wireless signal including the first information/signal through the transceiver 106. In addition, the processor 102 may receive a wireless signal including second information/signal through the transceiver 106 and then store information obtained from signal processing of the second information/signal in the memory 104. The memory 104 may be connected to the processor 102 and may store various information related to the operation of the processor 102. For example, the memory 104 may store software code including instructions for performing some or all of the processes controlled by the processor 102 or performing the previously described/suggested procedures and/or methods. Here, the processor 102 and the memory 104 may be part of a communication modem/circuit/chip designed to implement wireless communication technology (e.g., LTE, NR). The transceiver 106 may be connected with the processor 102 and may transmit and/or receive wireless signals through one or more antennas 108. The transceiver 106 may include a transmitter and/or a receiver. The transceiver 106 may be used with a radio frequency (RF) unit. In the present disclosure, the wireless device may refer to a communication modem/circuit/chip.

The second device 200 may include one or more processors 202 and one or more memories 204 and may further include one or more transceivers 206 and/or one or more antennas 208. The processor 202 may be configured to control the memory 204 and/or the transceiver 206 and may be configured to implement the functions, procedures, and/ or methods described/suggested above. For example, the processor 202 may process information in the memory 204 to generate first information/signal and then transmit a wireless signal including the first information/signal through the transceiver 206. In addition, the processor 202 may receive a wireless signal including second information/ signal through the transceiver 206 and then store information obtained from signal processing of the second information/signal in the memory 204. The memory 204 may be connected to the processor 202 and may store various information related to the operation of the processor 202. For example, the memory 204 may store software code including instructions for performing some or all of the processes controlled by the processor 202 or performing the previously described/suggested procedures and/or methods. Here, the processor 202 and the memory 204 may be part of a communication modem/circuit/chip designed to implement wireless communication technology (e.g., LTE, NR). The transceiver 206 may be connected with the processor 202 and may transmit and/or receive wireless signals through one or more antennas 208. The transceiver 206 may include a transmitter and/or a receiver. The transceiver 206 may be used with a radio frequency (RF) unit. In the present disclosure, the wireless device may refer to a communication modem/circuit/chip.

Hereinafter, hardware elements of the wireless devices 100 and 200 will be described in more detail. Although not limited thereto, one or more protocol layers may be implemented by one or more processors 102, 202. For example, one or more processors 102, 202 may implement one or more layers (e.g., functional layers such as PHY, MAC, RLC, PDCP, RRC, and SDAP). One or more processors 102 and 202 may generate one or more protocol data units (PDUs) and/or one or more service data units (SDUs) according to the functions, procedures, suggestions, and/or methods disclosed in this document. One or more processors 102 and 202 may generate messages, control information, data, or information according to the functions, procedures, suggestions and/or methods disclosed herein. One or more processors 102 and 202 may generate a signal (e.g., baseband signal) containing a PDU, an SDU, a message, control information, data or information according to the functions, procedures, suggestions and/or methods disclosed herein and provide the same to one or more transceivers 106 and 206. One or more processors 102 and 202 may receive signals (e.g., baseband signals) from one or more transceivers 106 and 206 and obtain an PDU, a SDU, a message, control information, data or information according to the functions, procedures, suggestions and/or methods disclosed herein.

The one or more processors 102 and 202 may be referred to as a controller, a microcontroller, a microprocessor, or a microcomputer. One or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in one or more processors 102 and 202. The functions, procedures, suggestions and/or methods disclosed in this document may be implemented using firmware or software, and firmware or software may be implemented to include modules, procedures, functions, and the like. Firmware or software configured to perform the functions, procedures, suggestions and/or methods disclosed in this document may be included in one or more processors 102 and 202, may be stored in one or more memories 104 and 204, and may be driven by one or more processors 102 and 202. The functions, procedures, suggestions and or methods disclosed in this document may be implemented using firmware or software in the form of codes, instructions and/or a set of instructions.

One or more memories 104, 204 may be connected to one or more processors 102 and 202 and may store various types of data, signals, messages, information, programs, codes, instructions, and/or commends. One or more memories 104 and 204 may include ROM, RAM, EPROM, flash memory, hard drive, registers, cache memory, computer readable storage medium, and/or combinations thereof. One or more memories 104 and 204 may be located inside and/or outside one or more processors 102 and 202. In addition, one or more memories 104 and 204 may be connected to one or more processors 102, 202 through various technologies such as wired or wireless connection.

The one or more transceivers 106 and 206 may transmit user data, control information, wireless signals/channels, and the like mentioned in the methods and/or operation flowcharts of this document to one or more other devices. The one or more transceivers 106 and 206 may receive user data, control information, wireless signals/channels, and the like mentioned in the functions, procedures, suggestions, methods and/or operational flowcharts, etc. disclosed herein from one or more other devices. For example, one or more transceivers 106 and 206 may be connected to one or more processors 102 and 202 and may transmit and receive wireless signals. For example, one or more processors 102 and 202 may control one or more transceivers 106 and 206 to transmit user data, control information, or wireless signals to one or more other devices. In addition, one or more processors 102 and 202 may control one or more transceivers 106 and 206 to receive user data, control information, or wireless signals from one or more other devices. In addition, one or more transceivers 106 and 206 may be connected to one or more antennas 108 and 208, and one or more transceivers 106 and 206 may be configured to transmit and receive user data, control information, wireless signals/channels, etc. mentioned in the functions, procedures, suggestions, methods and/or operational flowcharts disclosed in this document. In this document, one or more antennas may be a plurality of physical antennas or a plurality of logical antennas (e.g., antenna ports). One or more transceivers 106 and 206 may convert received wireless signal/channel from an RF band signal into a baseband signal in order to process received user data, control information, wireless signals/channels, etc. using one or more processors 102 and 202. One or more transceivers 106 and 206 may convert user data, control information, wireless signals/channels, etc. processed using one or more processors 102 and 202 from a baseband signal to an RF band signal. To this end, one or more of the transceivers 106 and 206 may include (analog) oscillators and/or filters.

Figure 27:
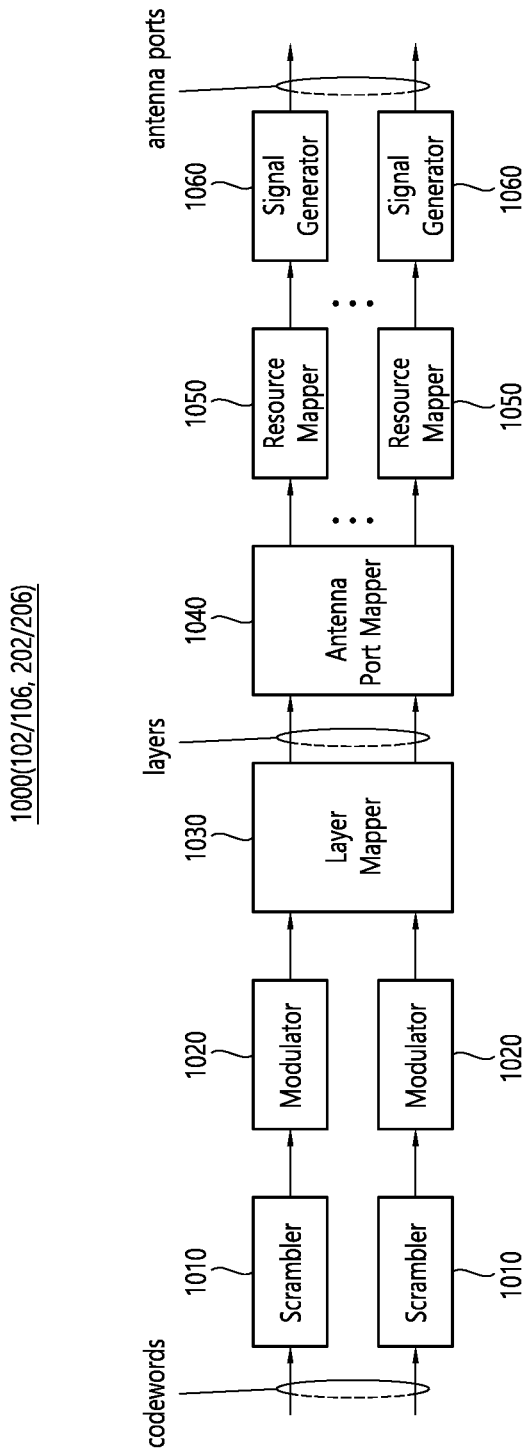
FIG. 27 illustrates a signal processing circuit for a transmission signal.

FIG. 27 illustrates a signal processing circuit for a transmission signal.

Referring to FIG. 27, the signal processing circuit 1000 may include a scrambler 1010, a modulator 1020, a layer mapper 1030, a precoder 1040, a resource mapper 1050, and a signal generator 1060. Although not limited thereto, the operations/functions of FIG. 27 may be performed in the processors 102 and 202 and/or the transceivers 106 and 206 of FIG. 26. The hardware elements of FIG. 27 may be implemented in the processors 102 and 202 and/or the transceivers 106 and 206 of FIG. 26. For example, blocks 1010 to 1060 may be implemented in the processors 102 and 202 of FIG. 26. Also, blocks 1010 to 1050 may be implemented in the processors 102 and 202 of FIG. 26, and block 1060 may be implemented in the transceivers 106 and 206 of FIG. 26.

A codeword may be converted into a wireless signal through the signal processing circuit 1000 of FIG. 27. Here, the codeword is an encoded bit sequence of an information block. The information block may include a transport block (e.g., a UL-SCH transport block, a DL-SCH transport block). The wireless signal may be transmitted through various physical channels (e.g., PUSCH and PDSCH) of FIG. A1.

Specifically, the codeword may be converted into a scrambled bit sequence by the scrambler 1010. The scramble sequence used for scramble may be generated based on an initialization value, and the initialization value may include ID information of a wireless device. The scrambled bit sequence may be modulated by the modulator 1020 into a modulation symbol sequence. The modulation scheme may include pi/2-binary phase shift keying (pi/2-BPSK), m-phase shift keying (m-PSK), m-quadrature amplitude modulation (m-QAM), and the like. The complex modulation symbol sequence may be mapped to one or more transport layers by the layer mapper 1030. Modulation symbols of each transport layer may be mapped to corresponding antenna port(s) by the precoder 1040 (precoding). An output z of the precoder 1040 may be obtained by multiplying an output y of the layer mapper 1030 by an N*M precoding matrix W. Here, N is the number of antenna ports, and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to a time-frequency resource. The time-frequency resource may include a plurality of symbols (e.g., CP-OFDMA symbols, DFT-s-OFDMA symbols) in a time domain and may include a plurality of subcarriers in a frequency domain. The signal generator 1060 may generate a wireless signal from the mapped modulation symbols, and the generated wireless signal may be transmitted to another device through each antenna. To this end, the signal generator 1060 may include an Inverse fast Fourier transform (IFFT) module and a cyclic prefix (CP) inserter, a digital-to-analog converter (DAC), a frequency uplink converter, and the like.

A signal processing process for a received signal in the wireless device may be configured as the reverse of the signal processing process 1010 to 1060 of FIG. 27. For example, the wireless device (e.g., 100 or 200 in FIG. 26) may receive a wireless signal from the outside through an antenna port/transceiver. The received wireless signal may be converted into a baseband signal through a signal restorer. To this end, the signal restorer may include a frequency downlink converter, an analog-to-digital converter (ADC), a CP canceller, and a fast Fourier transform (FFT) module. Thereafter, the baseband signal may be reconstructed into a codeword through a resource de-mapper process, a postcoding process, a demodulation process, and a descramble process. The codeword may be restored to an original information block through decoding. Accordingly, a signal processing circuit (not shown) for a reception signal may include a signal restorer, a resource demapper, a postcoder, a demodulator, a descrambler, and a decoder.

Figure 28:
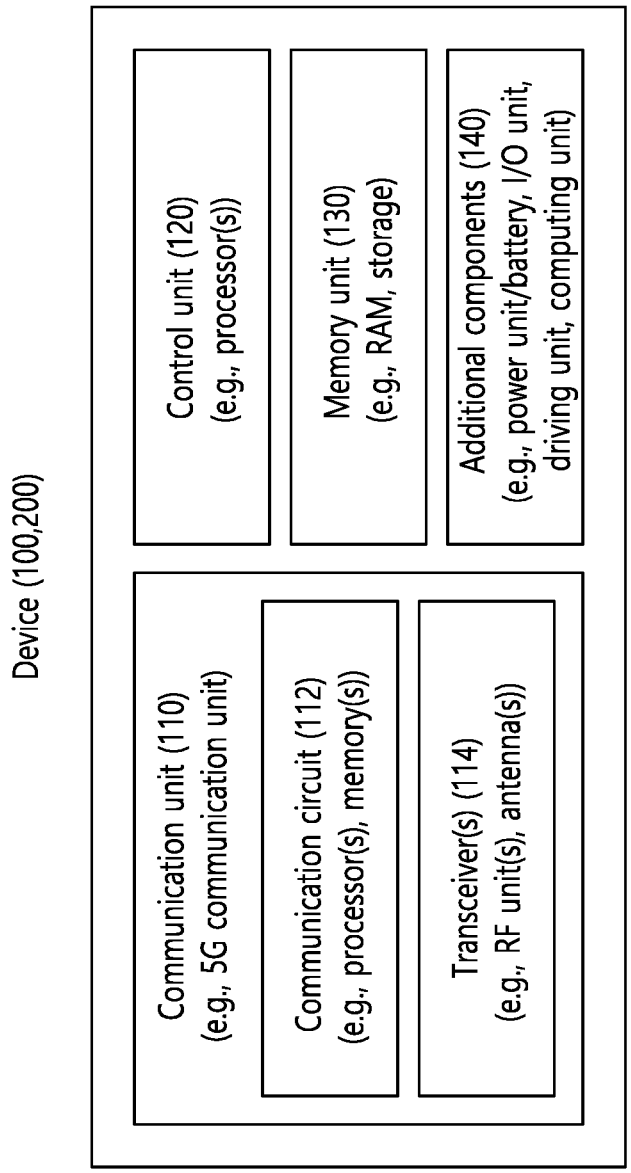
FIG. 28 shows another example of a wireless device applied to the present disclosure.

FIG. 28 shows another example of a wireless device applied to the present disclosure. The wireless devices may be implemented in various forms according to use-examples/services (see FIGS. 21 and 25 to 30).

Referring to FIG. 28, the wireless devices 100 and 200 correspond to the wireless devices 100 and 200 of FIG. 26 and may include various elements, components, units/units, and/or modules. For example, the wireless devices 100 and 200 may include a communication unit 110, a control unit 120, a memory unit 130, and an additional component 140. The communication unit may include a communication circuit 112 and a transceiver(s) 114. For example, communication circuit 112 may include one or more processors 102 and 202 and/or one or more memories 104 and 204 of FIG. 26. For example, the transceiver(s) 114 may include one or more transceivers 106 and 206 and/or one or more antennas 108 and 208 of FIG. 26. The control unit 120 may be electrically connected to the communication unit 110, the memory unit 130, and the additional component 140 and control general operations of the wireless device. For example, the control unit 120 may control the electrical/mechanical operation of the wireless device based on the program/code/command/information stored in the memory unit 130. In addition, the control unit 120 may transmit the information stored in the memory unit 130 to the outside (e.g., other communication device) via the communication unit 110 through a wireless/wired interface or store information received from the outside (e.g., other communication device) via the communication unit 110 through a wireless/wired interface in the memory unit 130.

The additional component 140 may be variously configured according to the type of wireless device. For example, the additional component 140 may include at least one of a power unit/battery, an I/O unit, a driving unit, and a computing unit. Although not limited thereto, the wireless device may be implemented in the form of the robot (FIG. 21, 100a), the vehicles (FIG. 21, 100b-1, 100b-2), the XR device (FIG. 21, 100c), the portable device (FIG. 21, 100d), the home appliance (100e of FIG. 25), the IoT device (100f of FIG. 25), a digital broadcasting terminal, a hologram device, a public safety device, an MTC device, a medical device, a fintech device (or financial device), a security device, a climate/environment device, an AI server/device (400 of FIG. 25), a base station (200 of FIG. 25), and a network node. The wireless device may be a mobile device or may be used in a fixed place depending on the use-example/service.

In FIG. 28, the various elements, components, units/units, and/or modules in the wireless devices 100 and 200 may all be interconnected through a wired interface, or at least some of them may be wirelessly connected through the communication unit 110. For example, in the wireless devices 100 and 200, the control unit 120 and the communication unit 110 may be connected by wire, and the control unit 120 and the first units (e.g., 130 and 140) may be connected wirelessly through the communication unit 110. In addition, each element, component, unit/unit, and/or module in the wireless devices 100 and 200 may further include one or more elements. For example, the control unit 120 may be configured as one or more processor sets. For example, the control unit 120 may include a set of a communication control processor, an application processor, an electronic control unit (ECU), a graphic processing processor, and a memory control processor. As another example, the memory unit 130 may include a random access memory (RAM), a dynamic RAM (DRAM), a read only memory (ROM), a flash memory, a volatile memory, and a non-volatile memory, and/or a combination thereof.

Hereinafter, an implementation example of FIG. 28 will be described in more detail with reference to the drawings.

Figure 29:
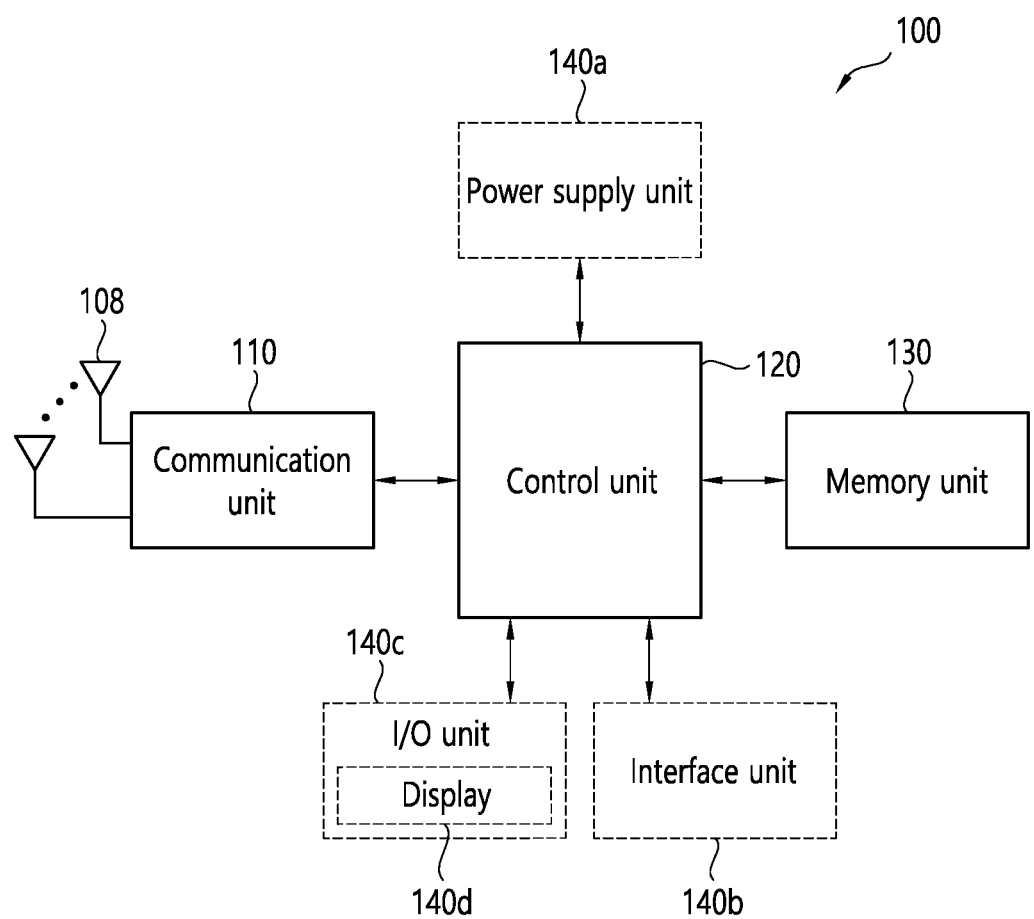
FIG. 29 illustrates a portable device applied to the present disclosure.

FIG. 29 illustrates a portable device applied to the present disclosure. The portable device may include smart phones, smart pads, wearable devices (e.g., smart watches, smart glasses), and portable computers (e.g., notebook computers). The portable device may be referred to as a mobile station (MS), a user terminal (UT), a mobile subscriber station (MSS), a subscriber station (SS), an advanced mobile station (AMS), or a wireless terminal (WT).

Referring to FIG. 29, the portable device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to blocks 110 to 130/140 of FIG. 28, respectively.

The communication unit 110 may transmit and receive signals (e.g., data, control signals, etc.) with other wireless devices and base stations. The control unit 120 may perform various operations by controlling components of the portable device 100. The control unit 120 may include an application processor (AP). The memory unit 130 may store data/parameters/programs/codes/commands required for driving the portable device 100. Also, the memory unit 130 may store input/output data/information, and the like. The power supply unit 140a may supply power to the portable device 100 and may include a wired/wireless charging circuit, a battery, and the like. The interface unit 140b may support connection between the portable device 100 and other external devices. The interface unit 140b may include various ports (e.g., audio input/output ports, video input/output ports) for connection with external devices. The I/O unit 140c may receive or output image information/signal, audio information/signal, data, and/or information input from a user. The I/O unit 140c may include a camera, a microphone, a user input unit, a display 140d, a speaker, and/or a haptic module.

For example, in the case of data communication, the I/O unit 140c acquires information/signals (e.g., touch, text, voice, image, video) input from the user, and the acquired information/signal may be stored in the memory unit 130. The communication unit 110 may convert the information/signal stored in the memory into a wireless signal and transmit the converted wireless signal directly to another wireless device or to a base station. In addition, after receiving a wireless signal from another wireless device or a base station, the communication unit 110 may restore the received wireless signal to the original information/signal. After the restored information/signal is stored in the memory unit 130, the restored information/signal may be output in various forms (e.g., text, voice, image, video, haptic) through the I/O unit 140c.

Figure 30:
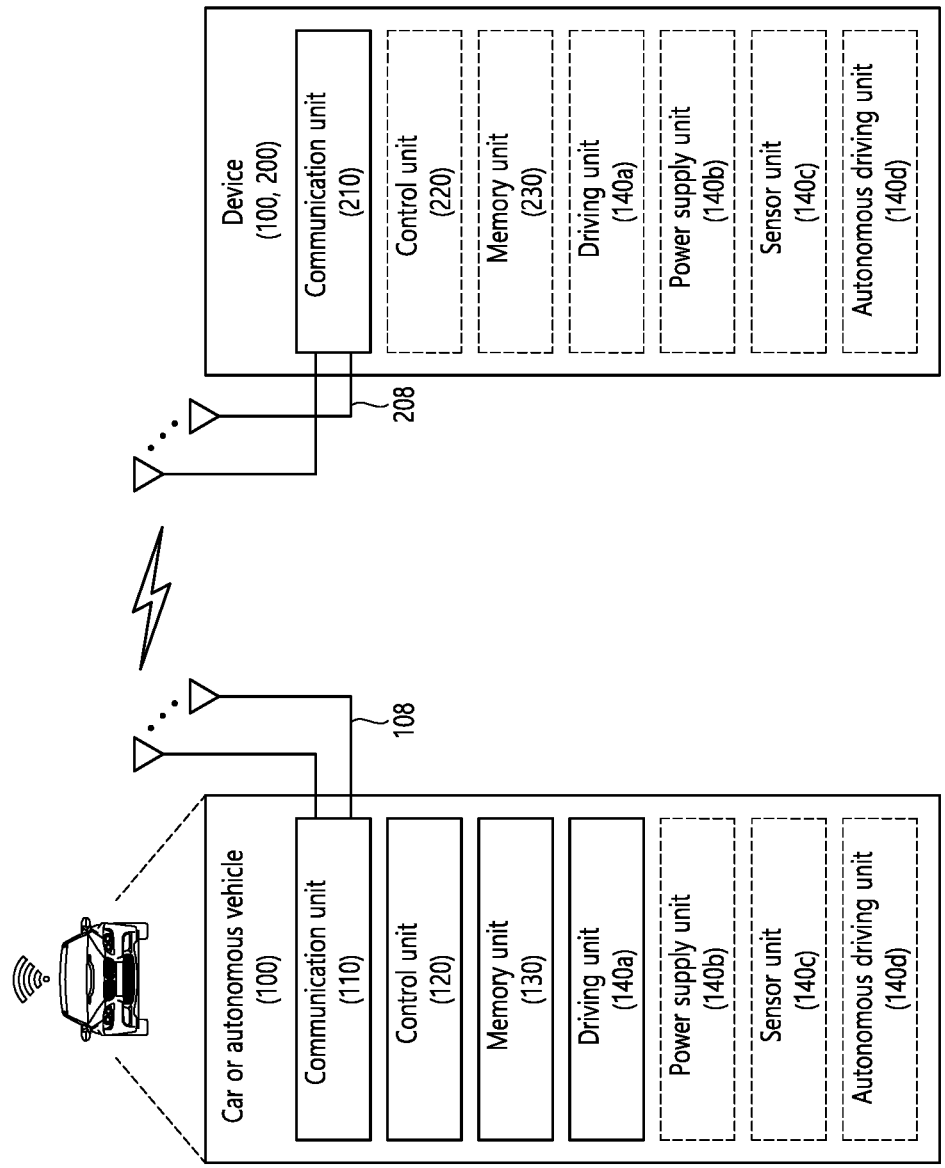
FIG. 30 illustrates a vehicle or an autonomous vehicle to which the present disclosure is applied.

FIG. 30 illustrates a vehicle or an autonomous vehicle to which the present disclosure is applied. The vehicle or autonomous vehicle may be implemented as a mobile robot, a vehicle, a train, an aerial vehicle (AV), or a ship.

Referring to FIG. 30, a vehicle or an autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. Blocks 110/130/140a to 140d correspond to blocks 110/130/140 of FIG. 28, respectively.

The communication unit 110 may transmit and receive signals (e.g., data, control signals, etc.) with external devices such as other vehicles, base stations (e.g. base stations, roadside base stations, etc.), and servers. The control unit 120 may perform various operations by controlling elements of the vehicle or the autonomous vehicle 100. The control unit 120 may include an electronic control unit (ECU). The driving unit 140a may cause the vehicle or the autonomous vehicle 100 to travel on the ground. The driving unit 140a may include an engine, a motor, a power train, a wheel, a brake, a steering device, and the like. The power supply unit 140b supplies power to the vehicle or the autonomous vehicle 100 and may include a wired/wireless charging circuit, a battery, and the like. The sensor unit 140c may obtain a vehicle status, surrounding environment information, user information, and the like. The sensor unit 140c may include an inertial measurement unit (IMU) sensor, a collision sensor, a wheel sensor, a speed sensor, an inclination sensor, a weight detection sensor, a heading sensor, a position module, a vehicle advancement/reverse sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement a technology that maintains a driving lane, a technology that automatically adjusts a speed such as adaptive cruise control, a technology that automatically drives along a predetermined route, and a technology that automatically sets a route and drives along the route when a destination is set.

For example, the communication unit 110 may receive map data, traffic information data, and the like from an external server. The autonomous driving unit 140d may generate an autonomous driving route and a driving plan based on the acquired data. The control unit 120 may control the driving unit 140a so that the vehicle or the autonomous driving vehicle 100 moves along the autonomous driving route according to the driving plan (e.g., speed/direction adjustment). During autonomous driving, the communication unit 110 may aperiodically/periodically acquire the latest traffic information data from the external server and may acquire surrounding traffic information data from nearby vehicles. In addition, during autonomous driving, the sensor unit 140c may acquire a vehicle state and surrounding environment information. The autonomous driving unit 140d may update the autonomous driving route and the driving plan based on newly acquired data/information. The communication unit 110 may transmit information on a vehicle location, the autonomous driving route, and the driving plan to the external server. The external server may predict traffic information data in advance using an AI technology or the like based on information collected from the vehicle or autonomous vehicle and may provide the predicted traffic information data to the vehicle or autonomous vehicle.

Figure 31:
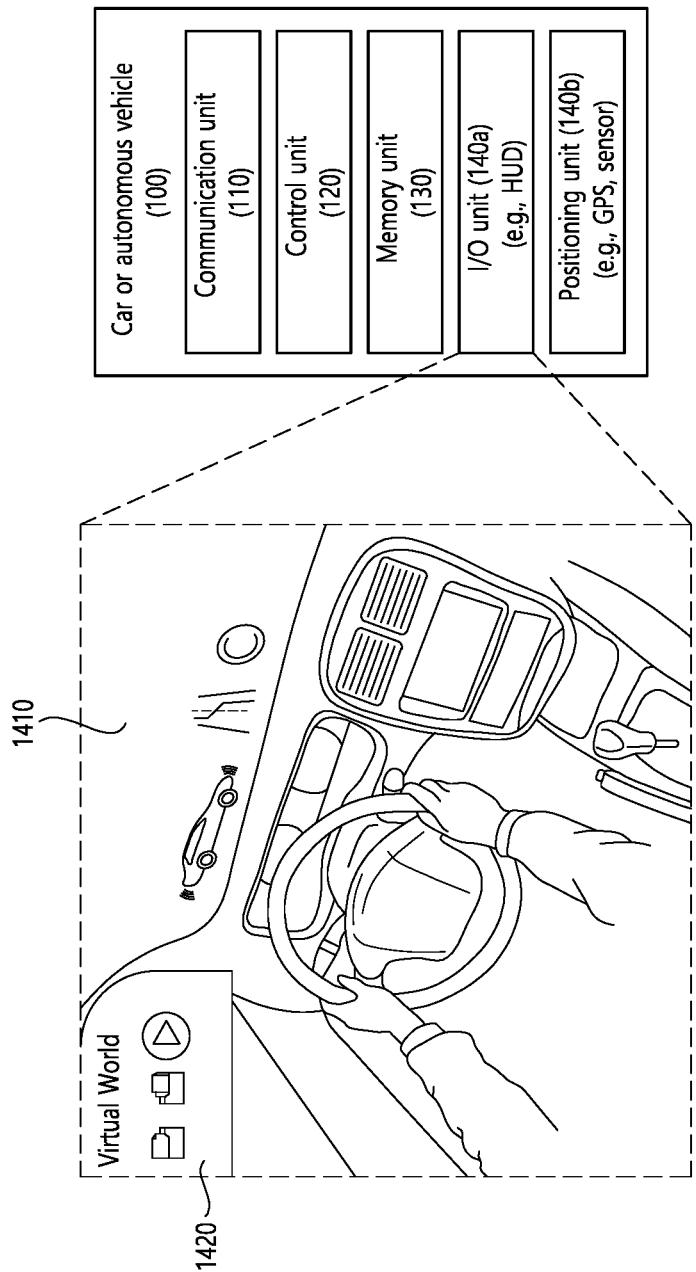
FIG. 31 illustrates a vehicle applied to the present disclosure.

FIG. 31 illustrates a vehicle applied to the present disclosure. The vehicle may also be implemented as means of transportation, trains, aircraft, and ships.

Referring to FIG. 31, the vehicle 100 may include a communication unit 110, a control unit 120, a memory unit 130, an I/O unit 140a, and a positioning unit 140b. Here, blocks 110 to 130/140a to 140b correspond to blocks 110 to 130/140 of FIG. 28, respectively.

The communication unit 110 may transmit and receive signals (e.g., data, control signals, etc.) with other vehicles or external devices such as a base station. The control unit 120 may perform various operations by controlling components of the vehicle 100. The memory unit 130 may store data/parameters/programs/codes/commands supporting various functions of the vehicle 100. The I/O unit 140a may output an AR/VR object based on information in the memory unit 130. The I/O unit 140a may include an HUD. The positioning unit 140b may acquire location information of the vehicle 100. The location information may include absolute location information of the vehicle 100, location information within a driving line, acceleration information, location information with nearby vehicles, and the like. The positioning unit 140b may include GPS and various sensors.

As an example, the communication unit 110 of the vehicle 100 may receive map information, traffic information, etc. from the external server and store the same in the memory unit 130. The positioning unit 140b may acquire vehicle location information through GPS and various sensors and store the vehicle location information in the memory unit 130. The control unit 120 may generate a virtual object based on map information, traffic information, vehicle location information, and the like, and the I/O unit 140a may display the generated virtual object on a window of the vehicle (1410, 1420). In addition, the control unit 120 may determine whether the vehicle 100 is operating normally within a driving line based on the vehicle location information. When the vehicle 100 deviates from the driving line abnormally, the control unit 120 may display a warning on a windshield of the vehicle through the I/O unit 140a. In addition, the control unit 120 may broadcast a warning message regarding a driving abnormality to nearby vehicles through the communication unit 110. Depending on the situation, the control unit 120 may transmit location information of the vehicle and information on driving/vehicle abnormalities to a related organization through the communication unit 110.

Figure 32:
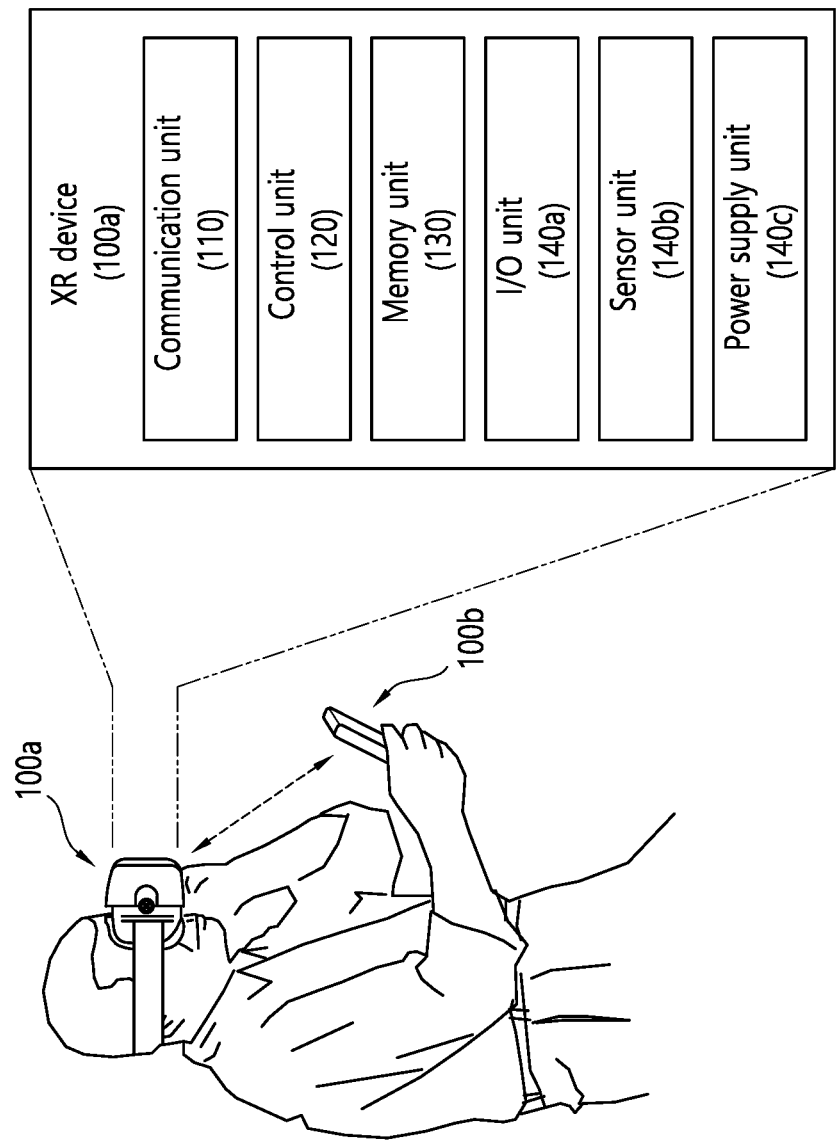
FIG. 32 illustrates an XR device applied to the present disclosure.

FIG. 32 illustrates an XR device applied to the present disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 32, the XR device 100a may include a communication unit 110, a control unit 120, a memory unit 130, an I/O unit 140a, a sensor unit 140b, and a power supply unit 140c. Here, blocks 110 to 130/140a to 140c correspond to blocks 110 to 130/140 of FIG. 28, respectively.

The communication unit 110 may transmit and receive signals (e.g., media data, control signals, etc.) with other wireless devices, portable devices, or external devices such as a media server. The media data may include video, images, and sound. The control unit 120 may perform various operations by controlling components of the XR device 100a. For example, the control unit 120 may be configured to control and/or perform procedures such as video/image acquisition, (video/image) encoding, and metadata generating and processing. The memory unit 130 may store data/parameters/programs/codes/commands required for driving the XR device 100a/generating an XR object. The I/O unit 140a may acquire control information, data, etc. from the outside and may output the generated XR object. The I/O unit 140a may include a camera, a microphone, a user input unit, a display unit, a speaker, and/or a haptic module. The sensor unit 140b may obtain an XR device status, surrounding environment information, user information, and the like. The sensor unit 140b may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar. The power supply unit 140c supplies power to the XR device 100a and may include a wired/wireless charging circuit, a battery, and the like.

As an example, the memory unit 130 of the XR device 100a may include information (e.g., data, etc.) necessary for generating an XR object (e.g., AR/VR/MR object). The I/O unit 140a may acquire a command to operate the XR device 100a from the user, and the control unit 120 may drive the XR device 100a according to the user's driving command. For example, when the user tries to watch a movie, news, etc. through the XR device 100a, the control unit 120 may transmit content request information to another device (for example, the portable device 100b) or a media server through the communication unit 130. The communication unit 130 may download/stream content such as movies and news from another device (e.g., the portable device 100b) or a media server to the memory unit 130. The control unit 120 may control and/or perform procedures such as video/image acquisition, (video/image) encoding, and metadata generating/processing for the content and generate/output an XR object based on information on a surrounding space or a real object acquired through the I/O unit 140a/sensor unit 140b.

In addition, the XR device 100a may be wirelessly connected to the portable device 100b through the communication unit 110, and the operation of the XR device 100a may be controlled by the portable device 100b. For example, the portable device 100b may operate as a controller for the XR device 100a. To this end, the XR device 100a may acquire 3D location information of the portable device 100b and then generate and output an XR object corresponding to the portable device 100b.

Figure 33:
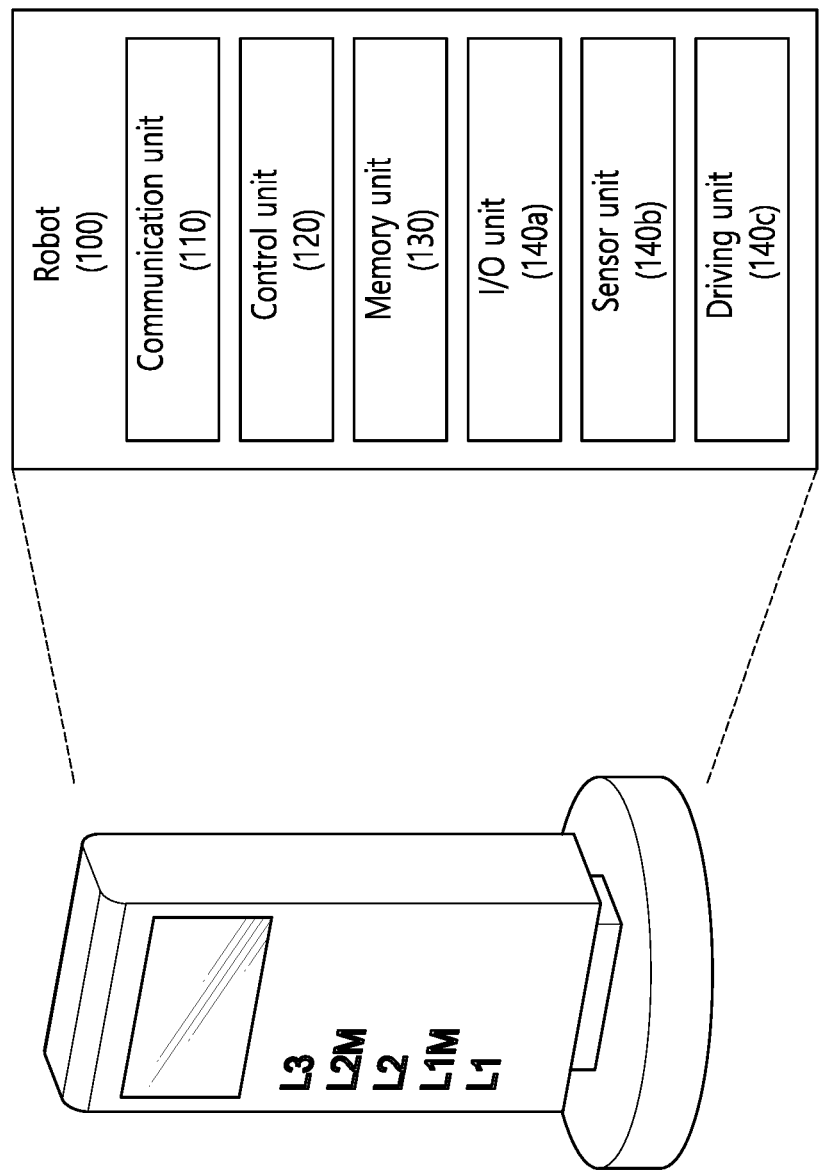
FIG. 33 illustrates a robot applied to the present disclosure.

FIG. 33 illustrates a robot applied to the present disclosure. Robots may be classified into industrial, medical, household, and military robots depending on the purpose or field of use.

Referring to FIG. 33, the robot 100 may include a communication unit 110, a control unit 120, a memory unit 130, an I/O unit 140a, a sensor unit 140b, and a driving unit 140c. Here, blocks 110 to 130/140a to 140c correspond to blocks 110 to 130/140 of FIG. 28, respectively.

The communication unit 110 may transmit and receive signals (e.g., driving information, control signals, etc.) with other wireless devices, other robots, or external devices such as a control server. The control unit 120 may perform various operations by controlling components of the robot 100. The memory unit 130 may store data/parameters/programs/codes/commands supporting various functions of the robot 100. The I/O unit 140a may acquire information from the outside of the robot 100 and may output information to the outside of the robot 100. The I/O unit 140a may include a camera, a microphone, a user input unit, a display unit, a speaker, and/or a haptic module. The sensor unit 140b may obtain internal information, surrounding environment information, user information, and the like of the robot 100. The sensor unit 140b may include a proximity sensor, an illuminance sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140c may perform various physical operations such as moving a robot joint. In addition, the driving unit 140c may cause the robot 100 to travel on the ground or fly in the air. The driving unit 140c may include an actuator, a motor, a wheel, a brake, a propeller, and the like.

Figure 34:
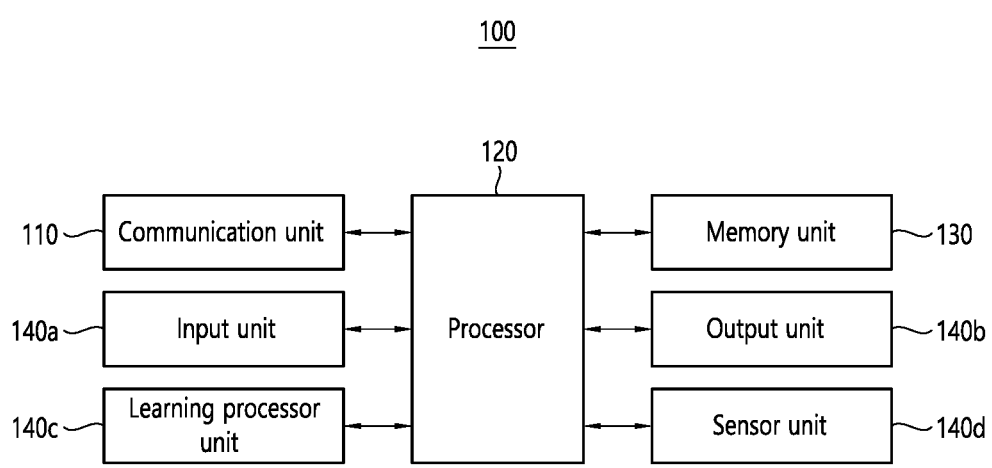
FIG. 34 illustrates an AI device applied to the present disclosure.

FIG. 34 illustrates an AI device applied to the present disclosure. AI devices may be implemented as fixed devices or mobile devices such as TVs, projectors, smartphones, PCs, notebooks, digital broadcasting terminals, tablet PCs, wearable devices, set-top boxes (STBs), radios, washing machines, refrigerators, digital signage, robots, vehicles, etc.

Referring to FIG. 34, the AI device 100 includes a communication unit 110, a control unit 120, a memory unit 130, input/output units 140a and 140b, a learning processor unit 140c, and a sensor unit 140d. Blocks 110 to 130/140a to 140d correspond to blocks 110 to 130/140 of FIG. 28, respectively.

The communication unit 110 may transmit or receive wired/wireless signals (e.g., sensor information, user inputs, learning models, control signals, etc.) with external devices such as other AI devices (e.g., FIG. 21, 100x, 200, 400) or external devices such as the AI server 200. To this end, the communication unit 110 may transmit information in the memory unit 130 to an external device or may transmit a signal received from the external device to the memory unit 130.

The control unit 120 may determine at least one executable operation of the AI device 100 based on information determined or generated using a data analysis algorithm or a machine learning algorithm. In addition, the control unit 120 may perform a determined operation by controlling the components of the AI device 100. For example, the control unit 120 may request, search, receive, or utilize data of the learning processor unit 140c or the memory unit 130 and control components of the AI device 100 to execute a predicted operation or an operation determined to be desirable among at least one executable operation. In addition, the control unit 120 may collect history information including the user's feedback on the operation content or the operation of the AI device 100 and stores the collected history information in the memory unit 130 or the learning processor unit 140c or transmit the history information to the external device such as the AI server (400 of FIG. 25). The collected history information may be used to update a learning model.

The memory unit 130 may store data supporting various functions of the AI device 100. For example, the memory unit 130 may store data obtained from the input unit 140a, data obtained from the communication unit 110, output data from the learning processor unit 140c, and data obtained from the sensing unit 140. In addition, the memory unit 130 may store control information and/or software codes necessary for the operation/execution of the control unit 120.

The input unit 140a may acquire various types of data from the outside of the AI device 100. For example, the input unit 120 may acquire learning data for model learning and input data to which the learning model is to be applied. The input unit 140a may include a camera, a microphone, and/or a user input unit. The output unit 140b may generate output related to visual, auditory, or tactile sensation. The output unit 140b may include a display unit, a speaker, and/or a haptic module. The sensing unit 140 may obtain at least one of internal information of the AI device 100, surrounding environment information of the AI device 100, and user information using various sensors. The sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar.

The learning processor unit 140c may train a model composed of an artificial neural network using the learning data. The learning processor unit 140c may perform AI processing together with the learning processor unit of the AI server (400 of FIG. 25). The learning processor unit 140c may process information received from an external device through the communication unit 110 and/or information stored in the memory unit 130. In addition, an output value of the learning processor unit 140c may be transmitted to an external device through the communication unit 110 and/or may be stored in the memory unit 130.

What is claimed is:

1. A method for transmitting scheduling information in a wireless communication system, the method performed by a user equipment (UE) that supports a vehicle-to-everything (V2X) operation, comprising:
   receiving a configuration related to the transmission of the scheduling information through a higher layer signaling; and
   transmitting the scheduling information based on a repeated transmission of a basic unit or a predefined resource,
   wherein the UE transmits the scheduling information by reflecting index information of a sequence applied to a reference signal related to the transmission of the scheduling information,
   wherein the index information has different values depending on a number of the repeated transmissions, a transmission timing of the scheduling information, or a transmission type, and
   wherein the index information is configured as a number related to a greatest transmission number among allowed repeated transmission numbers of the scheduling information.

2. The method of claim 1, wherein the configuration is a configuration for index information of a sequence applied to the reference signal transmitted together for the transmission of the scheduling information.

3. The method of claim 1, wherein the configuration related to the transmission of the scheduling information is preconfigured to the UE.

4. The method of claim 1, wherein the index information is a cyclic shift (CS) index.

5. The method of claim 1, wherein the UE informs a starting time or an ending time of the transmission of the scheduling information, or the number of repeated transmissions implicitly through the transmission of scheduling information on which the index information of the sequence is reflected.

6. The method of claim 1, wherein the index information has different values depending on a number of the repeated transmissions and a transmission starting timing of the scheduling information.

7. The method of claim 6, wherein the UE informs a starting time or an ending time of the transmission of the scheduling information, or the number of repeated transmissions implicitly through the transmission of scheduling information on which the index information of the sequence is reflected.

8. The method of claim 6, wherein the scheduling information is repeatedly transmitted 1, 2, 3, or 4 times,
   if the number of repeated transmissions is 1:
   when a starting time of the transmission of the scheduling information is a first transmission time, the index information has a first value, when a starting time of the transmission of the scheduling information is a second transmission time, the index information has a second value, when a starting time of the transmission of the scheduling information is a third transmission time, the index information has a third value, and when a starting time of the transmission of the scheduling information is a fourth transmission time, the index information has a fourth value;

if the number of repeated transmissions is 2:
    when a starting time of the transmission of the scheduling information is a first transmission time, the index information has a second value, when a starting time of the transmission of the scheduling information is a second transmission time, the index information has a third value, when a starting time of the transmission of the scheduling information is a third transmission time, the index information has a fourth value, and when a starting time of the transmission of the scheduling information is a fourth transmission time, the index information has a first value;
if the number of repeated transmissions is 3:
    when a starting time of the transmission of the scheduling information is a first transmission time, the index information has a third value, when a starting time of the transmission of the scheduling information is a second transmission time, the index information has a fourth value, when a starting time of the transmission of the scheduling information is a third transmission time, the index information has a first value, and when a starting time of the transmission of the scheduling information is a fourth transmission time, the index information has a second value;
if the number of repeated transmissions is 4:
    when a starting time of the transmission of the scheduling information is a first transmission time, the index information has a fourth value, when a starting time of the transmission of the scheduling information is a second transmission time, the index information has a first value, when a starting time of the transmission of the scheduling information is a third transmission time, the index information has a second value, and when a starting time of the transmission of the scheduling information is a fourth transmission time, the index information has a third value, and
wherein the first value, the second value, the third value, and the fourth value are different values.

9. The method of claim 8, wherein the first value is 0, the second value is 3, the third value is 6, and the fourth value is 9.

10. A user equipment (UE) that supports a vehicle-to-everything (V2X) operation, the UE comprising:
    a transceiver configured to transmit and receive a wireless signal; and
    a processor operably coupled with the transceiver,
    wherein the processor is configured to
    receive a configuration related to the transmission of the scheduling information through a higher layer signaling, and
    transmit the scheduling information based on a repeated transmission of a basic unit or a predefined resource,
    wherein the UE transmits the scheduling information by reflecting index information of a sequence applied to a reference signal related to the transmission of the scheduling information,
    wherein the index information has different values depending on a number of the repeated transmissions, a transmission timing of the scheduling information, or a transmission type, and
    wherein the index information is configured as a number related to a greatest transmission number among allowed repeated transmission numbers of the scheduling information.

11. A method for transmitting information related to a vehicle-to-everything (V2X) operation, the method performed by a base station comprising:
    transmitting the information related to the V2X operation,
    wherein the information related to the V2X operation includes information related to a configuration of index information of a sequence applied to a reference signal transmitted together for a transmission of scheduling information of a user equipment (UE), and
    wherein the index information has different values depending on a number of repeated transmissions, a transmission timing of the scheduling information, or a transmission types and
    wherein the index information is configured as a number related to a greatest transmission number among allowed repeated transmission numbers of the scheduling information.

* * * * *